United States Patent Office 3,515,719
Patented June 2, 1970

3,515,719
7-METHYL-6,19-EPOXY STEROIDS OF THE ANDROSTANE SERIES
J Allan Campbell, John C. Babcock, and John E. Pike, Kalamazoo, Mich., assignors to The Upjohn Company, Kalamazoo, Mich., a corporation of Delaware
No Drawing. Filed Mar. 15, 1967, Ser. No. 623,223
Int. Cl. C07c *173/00*
U.S. Cl. 260—239.55  21 Claims

---

ABSTRACT OF THE DISCLOSURE

This invention relates to novel processes for the production of 7α - methyl - 19 - nor-17β-hydroxy-4-androsten-3-one, novel physiologically active intermediates obtained in its production and novel physiologically active analogues obtained therefrom, e.g., 7α-methyl-6β,17β-dihydroxy-4-androsten-3-one 17-acylate,
7α-methyl-6β,17β-dihydroxy-5β-androstan-3-one 17-acylate,
7α-methyl-6β,19-epoxy-17β-hydroxy-5β-androstan-3-one 17-acylate,
7α-methyl-2β-bromo-6β,19-epoxy-17β-hydroxy-5β-androstan-3-one 17-acylate,
7α-methyl-6β,19-epoxy-17β-hydroxy-5β-androst-1-en-3-one 17-acylate,
7α-methyl-6β,19-epoxy-17β-hydroxy-4-androsten-3-one 17-acylate,
7α-methyl-17b,19-dihydroxy-4-androsten-3-one 17-acylate,
17β-hydroxy-7α-methyl-3-oxo-4-androsten-19-oic acid,
17-acylate,
7α-methyl-17β,19-dihydroxy-4-androsten-3-one,
3,17-dioxo-7α-methyl-4-androsten-19-oic acid,
7α-methyl-5(10)-estrene-3,17-dione,
3,3-dialkoxy-7α-methyl-5(10)-estren-17-one,
3,3-dialkoxy-7α-methyl-17α-alkenyl-5(10)-estren-17β-ol,
3,3-dialkoxy-7α-methyl-17α-alkyl-5(10)-estren-17β-ol,
7α-methyl-17β-hydroxy-17α-alkynyl-5(10)-estren-3-one,
7α-methyl-17β-hydroxy-17α-alkyl-4-estren-3-one,
7α-methyl-17β-hydroxy-17α-alkynyl-4-estren-3-one,
7α-methyl-17β-hydroxy-5(10)-estren-3-one 17-acylate
and 7α-methyl-3,3-dialkoxy-5(10)-estren-3β-ol 17-acylate.

---

BRIEF SUMMARY OF THE INVENTION

The novel compounds of this invention and 7α-methyl-19-nor-17β-hydroxy-4-androsten-3-one and processes for their preparation are illustratively represented by the following sequence of formulae:

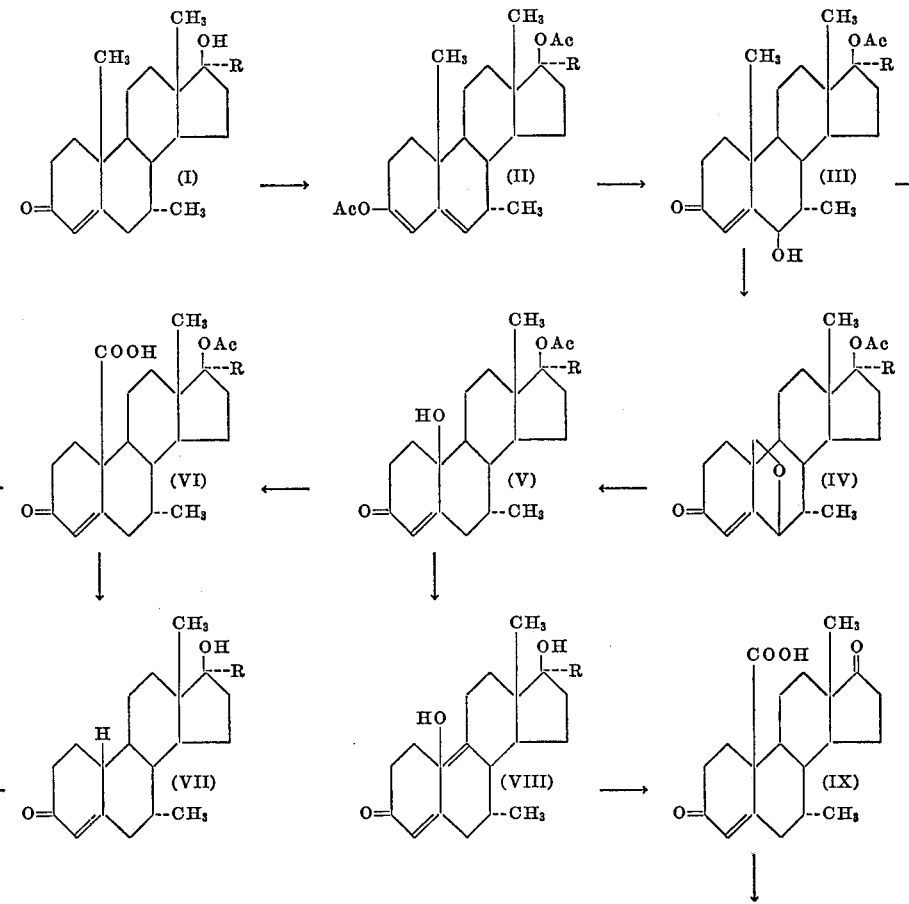

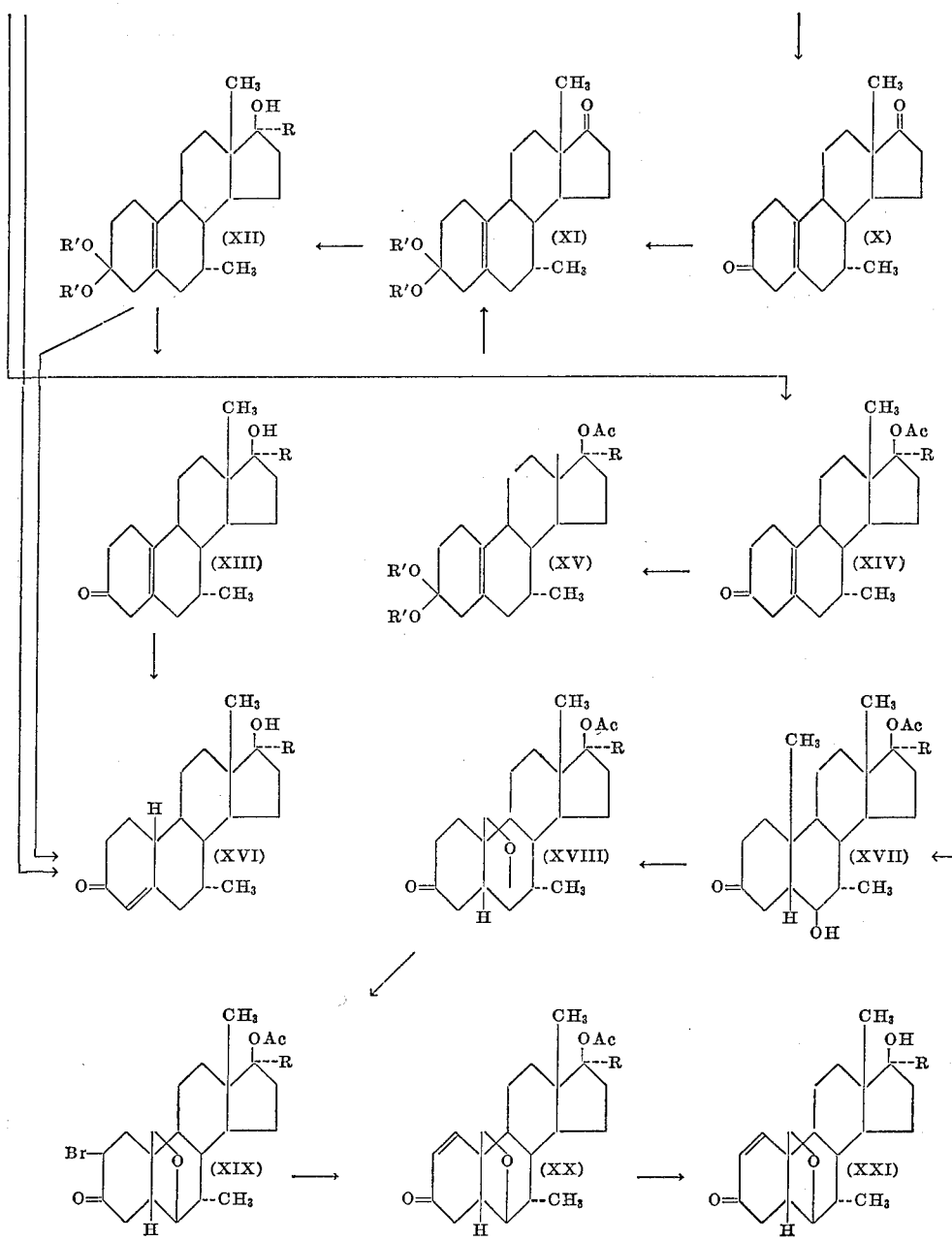

wherein Ac is the acyl radical of an organic carboxylic acid containing from one to twelve carbon atoms, inclusive; R is selected from the group consisting of hydrogen, lower alkyl, alkenyl, alkynyl and haloalkynyl of from one to twelve carbon atoms, inclusive; R' is lower alkyl of from one to twelve carbon atoms, inclusive.

The compounds embraced by Formulae II through XXI of the above flow-sheet possess anabolic, androgenic, progestational, anti-fertility and cholesterol lowering and CNS-depressant properties and are consequently useful in treating humans and animals in those conditions wherein such physiologic activity is desired.

The compounds represented by Formulae II through XXI of the flow-sheet shown above can be prepared and administered to mammals, birds, humans, and animals in a wide variety of oral and parenteral dosage forms, singly or in admixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages.

The therapeutically valuable compounds represented by Formula XVI are prepared from the known steroid of Formula I by methods A, B or C that follow.

METHOD A

Formula I→II→III→IV→V→VI→VII→XVI
of the flow-sheet, above

The starting material for the processes of the present invention is the known steroid 7α-methyl-17β-hydroxy-4-androsten-3-one (I).

(1) Treating this compound (I) with an acylating agent, for example, an anhydride, a chloride or bromide of an organic carboxylic acid, preferably a hydrocarbon carboxylic acid containing from one to twelve carbon atoms, inclusive, in the presence of an acid catalyst such as para-toluenesulfonic acid, sulfuric acid, perchloric acid and the like, or an isopropenyl acylate wherein the acyl group is that of a hydrocarbon carboxylic acid as defined above, yields a 7α-methyl-3,5-androstadiene - 3,17β - diol 3,17-diacylate (II) and 17α-alkyl derivatives thereof.

(2) The second step of the process is the oxidation of a 3,5-androstadiene 3,17-diacylate (II), e.g., by reaction with an organic peracid such as perpthalic acid, to yield a 7α-methyl-6β,17β-dihydroxy-4-androsten-3-one 17-acylate (III). The reaction is carried out in an inert organic solvent or mixture thereof, such as diethyl ether, chloroform, ethylene dichloride, dibutyl ether or tetrahydrofuran.

(3) This step of the process involves the 6β,19-epoxidation of a 6β-hydroxyl compound of Formula III, namely, by its light catalyzed (e.g., by ultraviolet irradiation) reaction (in an inert organic solvent such as benzene) with lead tetraacetate, resulting in the production of a 7α-methyl-17β-hydroxy-6β,19-epoxy-4-androsten - 3 - one 17-acylate (IV).

(4) In the fourth step of the process the 6β,19-epoxide function of a compound of Formula IV is reduced, for example, by heating said compound with zinc dust and acetic acid, to give 7α-methyl-17β,19-dihydroxy-4-androsten-3-one 17-acylate (V) and 17α-alkyl derivatives thereof.

(5) The fifth step comprises the oxidation (preferably at about 0° C.) of the 19-hydroxyl group of a thus produced 17β,19-diol (V) with an oxidizing agent, such as chromic acid or sodium dichromate, to produce a 7α-methyl-3-oxo-17β-hydroxy-4-androsten - 19 - oic acid 17-acylate (VI).

(6) This step of the process is the decarboxylation of the 19β-substituent of a compound of Formula VI, e.g., by heating said compound (preferably in the absence of oxygen) with a strong mineral acid, such as hydrochloric acid, to yield a 7α-methyl-9-nor-17β-hydroxy-4-androsten-3-one (VII).

(7) In this step conversion of the compound of Formula VII to those of Formula XVI, wherein R is alkynyl, haloalkynyl, alkenyl or alkyl, is achieved by employing standard reactions which are readily effected by utilizing the following procedures, which are well known in the steroid art.

(a) Oxidation of 7α-methyl-19-nor - 17β - hydroxy-4-androsten-3-one (VII) with oxidizing agents such as chromic acid, sodium dichromate, potassium dichromate and the like, using procedures known in the art, yields 7α-methyl-19-nor-4-androstene-3,17-dione.

(b) 7α-methyl-19-nor-4-androstene - 3,17 - dione, prepared as in (a), above, prior to the formation of its 17α-alkynyl or haloalkynyl derivative, must first be converted to the corresponding 3-enamine, 3-ketal or 3-enol ether in order to protect the 3-keto function from reacting. The 3-enamine formation can be accomplished in the manner described in U.S. Pat. 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethylpyrrolidine, 3-ethylpyrrolidine, 3-isopropylpyrrolidine, 3,3-dimethylpyrrolidine, 2-methylmorpholine, 3-methylmorpholine, and the like. Pyrrolidine is the preferred amine for use in the above reaction.

Advantageously, the 3-enamine is prepared by heating 7α-methyl-19-nor-4-androstene - 3,17 - dione and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamine of 7α-methyl-19-nor-4-androstene-3,17-dione so obtained is then reacted with an alkyne derivative, for example, the lithium, sodium or potassium derivative of the appropriate alkyne. The reaction is carried out preferably in the presence of an anhydrous inert solvent such as dimethylformamide, dimethylsulfoxide, ammonia and the like. The 3-enamines of the 7α-methyl-19-nor-17α-alkynyltestosterones so obtained are not generally isolated from the reaction mixture but are hydrolyzed in situ to the free 7α-methyl-19-nor - 17α - alkynyltestosterones by treatment with an aqueous solution of a base such as sodium hydroxide, potassium hydroxide, and the like, after first decomposing the reaction mixture with water, ammonium chloride, and the like.

The 7α-methyl-19-nor-17α-alkynyltestosterones so obtained can be purified, if desired, by procedures known in the art such as by recrystallization, chromatography, and the like.

The 7α-methyl-19-nor-17α-alkynyltestosterones can also be prepared by reacting the 3-enamine of 7α-methyl-19-nor-4-androstene-3,17-dione, prepared as described above, with the appropriate alkynyl magnesium halide. The reaction is preferably carried out in the presence of a solvent such as dimethyl ether, tetrahydrofuran, benzene and the like. Preferably, the Grignard reagent is employed in an excess of the order of 10 moles of the 3-enamine. The 3-enamines of 7α-methyl-19-nor-17α-alkynyltestosterone so obtained are generally not isolated from the reaction mixture but are hydrolyzed in situ to the free 7α-methyl-19-nor-17α-alkynyltestosterones by the method described above.

In converting 7α - methyl - 19 - nor-4-androstene-3,17-diones to the corresponding 17α-alkynyl and haloalkynyl derivatives, 3-keto protecting groups in addition to the 3-enamines described above, such as 3-ketals and 3-enol ethers, can be employed. Treatment of a 3-ketal or 3-enol ether of 7α-methyl-19-nor-4-androstene-3,17-dione with an alkali metal derivative of an appropriate alkyne or haloalkyne yields the corresponding 17α-alkynyl derivative, which on hydrolysis gives the corresponding 3-ketone. Methods for the preparation of 3-ketals and 3-enol ethers of a variety of 3-keto compounds of the androstane series, and their subsequent alkynylation or haloalkynylation, is described in detail in J. Chem. Soc. 4995 (1962).

(c) The ankynyl compounds prepared as in (b), above, can be readily reduced at the 17α-position exclusively (e.g., with hydrogen in the presence of a palladium catalyst) to give the corresponding 17α-alkenyl and 17α-alkyl compounds (XVI). For example, by employing the foregoing procedure, 7α - methyl - 19 - nor-17β-hydroxy-17α-ethynyl-4-androsten-3-one (XVI) is converted to 7α-methyl - 19-nor-17β-hydroxy-17α-vinyl-4-androsten-3-one (XVI) when 1 mol-equivalent of hydrogen is consumed; 7α - methyl-19-nor-17β-hydroxy-17α-ethyl-4-androsten-3-one(XVI) is produced by following the same procedure except that hydrogenation is continued until the consumption of 2 mol-equivalents of hydrogen is effected.

(d) The 3-enamines of 7α-methyl-19-nor-4-androstene-3,17-dione, prepared as in (b), above, can be converted to the corresponding 17β-hydroxy-17α-alkyl derivatives by treatment with an appropriate alkylating agent such as an appropriate Grignard reagent or alkyl lithium compound. For example, the 3-enamine of 7α-methyl-19-nor-4-androstene-3,17-dione when heated under reflux in an inert solvent (e.g., benzene-tetrahydrofuran) with methylmagnesium bromide yields the 3-enamine of 7α,-17α-dimethyl-19-nor-17β-hydroxy-4-androsten-3-one. The 17α-alkylated-3-enamine produced by the reaction of an appropriate alkylating agent (e.g., a Grignard reagent or alkyl lithium) with a 3-enamine of 7α-methyl-19-nor-4-androstene-3,17-dione is generally not isolated from the reaction mixture, but it hydrolyzed in situ to the corresponding 7α-methyl-17α-alkyl derivative (XVI) by treatment with an aqueous solution of a base such as sodium hydroxide, potassium hydroxide, etc., after first decomposing the reaction mixture with water, ammonium chloride, and the like. By following the foregoing procedure, 7α - methyl - 19 - nor-4-androstene-3,17-dione 3- pyrrolidinyl enamine is converted to 7α-,17α-dimethyl-19-nor-17β-hydroxy-4-androsten-3-one (XVI).

Also by substituting a 17α-lower methyltestosterone for the 7α-methyltestosterone (I) in Method A steps 1-6, there are produced the 17α-lower alkyl-7α-methyl-19-nortestosterones.

METHOD B

Formula I→II→III→IV→V→VIII→IX→X→XI→XII→XIII→XVI of the flow-sheet above.

(1), (2), (3), (4), The 7α-methyl-17β,19-dihydroxy-4-androsten-3-one 17-acylates (V) are prepared from 7α-methyl-17β-hydroxy-4-androsten-3-one (I) as described in the first four steps of Method A, above.

(5) In the next step of the process a 7α-methyl-17β,19-dihydroxy-4-androsten-3-one 17-acylate (V), produced as in the immediate preceding paragraph, has its 17-acylate group hydrolyzed, for example, by the compound (V) (e.g., at reflux) in an essentially oxygen-free solution of a lower alkanol (e.g., absolute methanol) containing a strong acid (e.g, hydrochloric acid) to yield 7α-methyl-17β,19-dihydroxy-4-androsten-3-one (VIII).

(6) The sixth step of the process involves the oxidation of the 17β- and 19-hydroxy functions of the compound of Formula VIII, for example, with chromic acid, to yield 7α-methyl-3,17-dioxo-4-androstene-19-oic acid (IX).

(7) In this step 7α-methyl-3,17-dioxo-4-androstene-19-oic acid (IX) is decarboxylated for example, by treatment with a tertiary nitrogen base (e.g., pyridine) at moderate temperature (e.g., 50° C.) to give 7α-methyl-5(10)-estrene-3,17-dione (X).

(8) The eighth step of the process provides for the 3-ketalization of 7α-methyl-5(10)-estrene-3,17-dione (X), for example, by its treatment in a lower alkanol (e.g., methanol) solution containing a weak organic acid (e.g., malonic acid) at about room temperature (e.g., 20 to 25° C.) to yield a 7α-methyl-5(10)-estrene-3,17-dione 3-dialkyl ketal (XI).

(9) In this step the conversion of the compounds of Formula XI to those of Formula XII, wherein R is alkynyl, haloalkynyl, alkenyl or alkyl, is carried out by employing essentially the procedures described in step 7(b), (c) and (d) of Method A, above; the only differences are that here the starting materials and products are 3-dialkyl ketals of 5(10)-estren-3-ones instead of 4-estren-3-ones as in 7(b), (c) and (d).

(10) The tenth step of the process is the hydrolysis of a 7α-methyl-17β-hydroxy-17α-alkynylhaloalkynyl, alkenyl or alkyl)-5(10)-estren-3-one 3-dialkyl ketal (XII), for example, by its treatment in an essentially oxygen-free solution with a ketone (e.g., acetone) containing a strong acid (e.g., hydrochloric acid) at moderate (room) temperature to give the corresponding 7α-methyl-19-nor-17β-hydroxy-17α-alkynyl(haloalkynyl, alkenyl or alkyl)-4-androsten-3-one (XVI).

(11) Instead of directly converting a 7α-methyl-17β-hydroxy-17α-alkynyl (haloalkynyl, alkenyl, or alkyl)-5(10)-estren-3-one 3-dimethyl ketal (XII) to the corresponding 7α-methyl-19-nor-17β-hydroxy-17α-alkynyl-(haloalkynyl, alkenyl or alkyl)-4-androsten-3-one (XVI), a compound of Formula XII can be hydrolyzed, for example, by treating it with a ketone (e.g., acetone) containing a water solution of a weak organic acid (e.g., malonic acid) at room temperature to yield the corresponding 7α-methyl-17β-hydroxy-17α-alkynyl (haloalkynyl, alkenyl or alkyl)-5(10)-estren-3-one (XIII).

(12) Rearrangement of a 7α-methyl-17β-hydroxy-17α-alkynyl (haloalkynyl, alkenyl, alkyl)-5(10)-estren-3-one (XIII) (produced as in the immediately preceding step), for example, by treatment in an aqueous lower alkanol (e.g., methanol) solution containing a strong acid (e.g., hydrochloric acid) at room temperature, yields the corresponding 7α-methyl - 19 - nor-17β-hydroxy-17α-alkynyl (haloalkynyl, alkenyl, alkyl)-4-androsten-3-one (XVI).

METHOD C

Formula I→II→III→IV→V→VI→XIV→XV→XI→XII→XIII→XVI
of the flow-sheet, above.

(1), (2), (3), (4), (5) The 7α-methyl-3-oxo-17β-hydroxyl-4-androsten-19-oic acid 17-acylates (VI) are prepared from 7α-methyl-17β-hydroxy-4-androsten-3-one (I) as described in the first five steps of Method A, above.

(6) In this step of the process a 7α-methyl-3-oxo-17β-hydroxy-4-androsten-19-oic acid 17-acylate (VI) is decarboxylated, for example, by treatment with a tertiary nitrogen base (e.g., pyridine) at moderate temperature (e.g., 50° C.) to yield a 7α-methyl-17β-hydroxy-5(10)-estren-3-one 17-acylate (XIV).

(7) The seventh step of the process embraces the 3-dialkylketalization of a 7α-methyl-17β-hydroxy-5(10)-estren-3-one 17-acylate (XIV), for example, by its treatment in a lower alkanol (e.g., methanol) solution containing a weak organic acid (e.g., malonic acid) at about room temperature (e.g., 20 to 25° C.) to yield the corresponding 7α-methyl-17β-hydroxy-5(10)-estren-3-one 17-acylate 3-dialkyl ketal (XV).

(8) In this step a 7α-methyl-17β-hydroxy-5(10)-estren-3-one 17-acylate 3-dialkyl ketal (XV) is hydrolyzed, for example, with a base (e.g., potassium carbonate) in a lower alkanol (e.g., methanol) solution at room temperature to yield the corresponding 17β-hydroxy compound; oxidation of the 17β-hydroxyl group of a thus produced 7α-methyl-17β-hydroxy-5(10)-estren-3-one 3-dialkyl ketal, for example, with an oxidizing agent (e.g., sodium dichromate in acetic acid) at low temperature (e.g., 0° C.) gives the corresponding 7α-methyl-5(10)-estrene-3,17-dione 3-dialkyl ketal (XI).

(9), (10), (11), (12) These steps are identical with those of the same numbers set forth in Method B, above.

When a 17-alkyl derivative of VI, prepared as described in Method A, is substituted in step 6 of Method C, there is produced a 17α-lower alkyl derivative of XIV.

Physiologically active 7α-methyl compounds in addition to those prepared in Methods A, B and C, above, can be synthesized, as described below, from the steroidal starting material of Formula I by the following sequence of reactions: Formula

I→II→III→XVII→XVIII→XIX→XX of the flow-sheet, above.

(1), (2) The 7α-methyl-6β,17β-dihydroxy-4-androsten-3-one 17-acylates (III) are prepared from 7α-methyl-17β-hydroxy-4-androsten-3-one (I) as described in the first two steps of Method A, above.

(3) In this step of the process a 7α-methyl-6β,17β-dihydroxy-4-androsten-3-one 17-acylate (III) is hydrogenated at the 4(5)-position, for example, in an alkanol solution (e.g., 95% ethyl alcohol) in the presence of a catalyst (e.g., palladium on charcoal) to yield a 7α-methyl-6β,17β-dihydroxy-5β-androstan-3-one 17-acylate (XVII).

(4) The fourth step involves the 6β,19-epoxidation of a 6β-hydroxide of Formula XVII, namely, by its catalyzed (e.g., iodine) reaction (in an inert solvent such as cyclohexane) with lead tetraacetate at reflux temperature, followed by treatment with zinc dust and acetic acid to yield a 7α-methyl-6β,19-epoxy-17β-hydroxy-5β-androstan-3-one 17-acylate (XVIII).

A compound of Formula XVII can also be converted to the corresponding 6β,19-epoxide (XVIII) by first forming its 3-alkylene ketal (e.g., by reaction with an alkylene glycol in the presence of an acid catalyst such as para-toluenesulfonic acid), then carrying out the 6β,19-epoxidation as in the immediately preceding paragraph and hydrolyzing the 3-alkylene ketal group (e.g., with an acid such as acetic acid) at steam bath temperature, to yield a 7α-methyl-6β,19-epoxy-17β-hydroxy-5β - androstan-3-one 17-acylate (XVIII).

(5) In this step of the process a compound of Formula XVIII is brominated at the 2β-position, for example, by its treatment with bromine in acid solution (e.g., acetic acid) in the presence of an acid catalyst such as paratoluenesulfonic acid to yield a 7α-methyl-2β-bromo-6β,19-epoxy-17β-hydroxy-5β-androstan-3-one 17-acylate (XIX).

(6) In the sixth step a compound of Formula XIX is dehydrobrominated, for example, by its treatment in a solvent such as dimethylformamide with alkali metal salts (e.g., lithium chloride and/or lithium carbonate) in an essentially oxygen-free atmosphere at reflux temperature, to yield a 7α-methyl-6β,19-epoxy-17β-hydroxy-5β-androst-1-en-3-one 17-acylate (XX). Hydrolysis of XX by treatment in an aqueous alcohol solution containing mineral acid affords 7α-methyl-6β,9-epoxy-17β-hydroxy-5β-androst-1-en-3-one (XXI).

All of the compounds embraced by Formulae II through XXI can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ethylene chloride; also by gradient elution chromatography from an adsorbent column with a suitable mixture of solvents, such as, methylene chloride-Skellysolve B (hexanes), acetone-Skellysolve B, and the like.

DETAILED DESCRIPTION

Example 1.—7α-methyl-3,5-androstadiene-3,17β-diol 3,17-diacetate (II)

A solution of 10 g. of the known compound 7α-methyl-17β-hydroxy-4-androsten-3-one (I), 1 g. of paratoluenesulfonic acid and 100 ml. of acetic anhydride in 400 ml. of toluene was refluxed under nitrogen for about 5 hours. The solution was washed with water containing a small amount of pyridine, then several times with water, dried over magnesium sulfate, filtered and the solvent removed to yield crystalline 7α-methyl-3,17β-dihydroxy-3,5-androstadiene 3,17-diacetate (II). The product was dried thoruoghly under high vacuum to remove the last traces of acetic anhydride.

Following the procedure of Example 1 but substituting for acetic anhydride other anhydrides such as those of propionic, butyric, valeric, hexanoic, lauric, trimethylacetic, isobutyric, isovaleric, t-butylacetic, β-cyclopentylpropionic, cyclohexylacetic, benzoic, phenylacetic, β-phenylpropionic, ortho-, meta- or para-toluic, undecylenic, propiolic, cinnamic, trifluoroacetic, chloroacetic and furoic acid and the like, yields the corresponding 3,17-diacylates of 7α-methyl-3,5-androstadiene-3,17β-diol (II).

Example 2.—7α-methyl-6β,17β-dihydroxy-4-androsten-3-one 17-acetate (III)

The product of Example 1, 7α-methyl-3,5-androstadiene-3,17β-diol 3,17-diacetate (II), was dissolved in 240 ml. of chloroform, cooled in an ice bath, and 83 ml. of 0.8 N perphthalic acid in ether added. The ice in the bath was allowed to melt. After about 16 hours the solution was washed with water, dilute sodium bicarbonate solution, again with water, dried, filtered and concentrated to dryness. The residue was chromatographed through a 300 g. column of alumina and recrystallized from a mixture of acetone and Skellysolve B then from aqueous methanol to yield 4.55 g. of 7α-methyl-6β,17β-dihydroxy-4-androsten-3-one 17-acetate (III), melting at 195 to 197° C. An analytical sample had a melting point of 194 to 196° C., $$\lambda_{max.}^{alc.} \ 237 \ m\mu \ (\epsilon = 14{,}150)$$

[α]$_D$+28° (chloroform).

Analysis.—Calc'd. for $C_{22}H_{32}O_4$ (percent): C, 73.30; H, 8.95. Found (percent): C, 72.89; H, 9.13.

Following the hydrolysis procedure of Example 34 but substituting 7α-methyl-6β,17β - dihydroxy-4-androsten-3-one 17-acetate (III) yields the corresponding 17-free alcohol.

Example 3.—7α-methyl-17β-hydroxy-6β,19-epoxy-4-androsten-3-one 17-acetate (IV)

A solution of 1 g. of 7α-methyl-6β,17β-dihydroxy-4-androsten-3-one 17 acetate (III) (prepared as in Example 2), 5 g. of lead tetraacetate and 1 ml. of pyridine in 250 ml. of benzene was irradiated by ultraviolet light and cooled internally by a cold finger. After about 2.25 hours the reaction mixture was filtered and the filtrate washed with water, dilute sodium bicarbonate solution, again with water, dried and the solvent removed. The residue was chromatographed through a 200 g. column of Florisil (synthetic magnesium silicate) with gradient elution between 5 l. of Skellysolve B and 5 l. of 10% acetone-Skellysolve B. The product (IV) was recrystallized twice from acetone-Skellysolve B to give 7α-methyl-17β-hydroxy-6β-19-epoxy-4-androsten-3-one 17-acetate (IV), melting at 176 to 180° C.;

$$\lambda_{max.}^{alc.} \ 239 \ m\mu \ (\epsilon = 12{,}350)$$

Infrared absorption and nuclear magnetic resonance spectra support the proposed structure.

Analysis.—Calc'd. for $C_{22}H_{30}O_4$ (percent): C, 73.71; H, 8.44. Found (percent): C, 73.37; H, 8.06.

Following the hydrolysis procedure of Example 34 but substituting 7α-methyl-17β-hydroxy-4-androsten-3-one 17-acetate (IV) gives the corresponding 17-free alcohol.

Example 4.—7α-methyl-17β,19-dihydroxy-4-androsten-3-one 17-acetate (V)

Zinc dust (2.5 g.) was washed several times with 1:1 acetic acid and water then several times with glacial acetic acid. Care was taken to keep the zinc very wet at all times. To the activated zinc was added 100 mg. of 7α-methyl-17β - hydroxy-6β,19-epoxy-4-androsten-3-one 17-acetate (IV) (prepared as in Example 3) in 2 ml. of acetic acid. The mixture was stirred and heated on a steam bath for 15 minutes. The excess zinc was filtered and washed with acetic acid. The filtrate was concentrated to about 3 ml. with a rotary evaporator, diluted with ether, washed with water, dilute sodium bicarbonate solution, again with water and dried. The solvent was removed, to afford a residue. The residue was dissolved in methylene chloride and the solution chromatographed through a 100 g. column of Florisil. The column was eluted by gradient elution between 3 l. of 5% acetone-Skellysolve B and 3 l. of 20% acetone-Skellysolve B. The product (V) was recrystallized from acetone-Skellysolve B to give 50 mg. of 7α-methyl-17β,19-dihydroxy-4-androsten-3-one 17-acetate (V) melting at 158 to 159° C. and $$\lambda_{max.}^{alc.} \ 244 \ m\mu \ (\epsilon = 14{,}800)$$

Nuclear magnetic resonance and infrared absorption spectra support the proposed structure.

Example 5.—7α-methyl-3-oxo-17β-hydroxy-4-androsten-19-oic acid 17-acetate (VI)

To a solution of 200 mg. of 7α-methyl-17β,19-dihydroxy-4-androsten-3-one 17-acetate (V) (prepared as in Example 4) in 15 ml. of acetone stirred and cooled in an ice bath, 8 ml. of chromic acid solution (prepared from 27 g. of chromium trioxide and 23 ml. of concentrated sulfuric acid and diluted to 100 ml. with water) was added dropwise. After 1 hour the excess chromic acid was destroyed by the addition of 2 ml. of isopropyl alcohol. Water was added and the product extracted with 3 portions of ether. The extracts were washed with water and dried. Removal of the solvent yielded a residue of essentially pure 7α - methyl-3 - oxo-17β-hydroxy-4-androsten-19-oic acid 17-acetate (VI). If desired, the residue can be further purified by recrystallization or countercurrent distribution.

Example 6.—7α-methyl-19-nor-17β-hydroxy-4-androsten-3-one (VII)

The residue from Example 5, 7α-methyl-3-oxo-17β-hydroxy-4-androsten-19-oic acid 17-acetate (VI), was dissolved in a solution of 0.3 ml. of hydrochloric acid in 5 ml. of methanol which had been purged with nitrogen. The solution was refluxed under nitrogen for half an hour. The solution was diluted with methylene chloride, washed with water, dilute sodium bicarbonate solution, again with water and dried. The solution was poured onto a colum of 80 g. of Florisil and eluted by gradient elution between 3 l. of 5% acetone-Skellysolve B and 3 l. of 15% acetone-Skellysolve B. The product was recrystallized from acetone-Skellysolve B to give 65 mg. of 7α-methyl - 19 - nor - 17β-hydroxy-4-androsten-3-one (VII) melting at 144 to 147° C. and $$\lambda_{max.}^{alc.} \ 241 \ m\mu \ (\epsilon = 17,000)$$

Infrared and nuclear magnetic resonance spectra confirm the expected structure.

Example 7.—7α-methyl-17β,19-dihydroxy-4-androsten-3-one (VIII)

A solution of 1 g. of 7α-methyl-17β,19-dihydroxy-4-androsten-3-one 17-acetate (V) (prepared as in Example 4) in 100 ml. of absolute methanol containing 2 ml. of concentrated hydrochloric acid is purged with nitrogen, then refluxed for about 2 hours. The course of the reaction is readily followed by thin layer chromatography. The solution is concentrated and extracted with methylene chloride, washed with water, dilute sodium bicarbonate solution, again with water and the solvent removed. The resulting crude residue, 7α-methyl-17β,19-dihydroxy-4-androsten-3-one (VIII), can be used in Example 8 without purification or purified by chromatography on Florisil or other adsorbents and/or by crystallization.

Example 8.—7α-methyl-3,17-dioxo-4-androstene-19-oic (IX)

A solution of 10 g. of 7α-methyl-17β-dihydroxy-4-androsten-3-one (VIII) (prepared as in Example 7) is dissolved in 1 l. of acetone and 40 ml. of chromic acid solution (prepared from 27 g. of chromium trioxide and 23 ml. of concentrated sulfuric acid and diluted to 100 ml. with water) added dropwise at 10° C. with stirring. After 30 minutes the excess chromic acid is destroyed by dropwise addition of isopropanol. The reaction mixture is concentrated to about 200 ml. employing a rotary evaporator at below room temperature, diluted with water and extracted with methylene chloride. The extract is washed with about 30% ammonium sulfate solution, dried over sodium sulfate, filtered and concentrated to dryness under vacuum. The residue, 7α-methyl-3,17-dioxo-4-androsten-19-oic acid (IX) is recrystallized from ether or acetone-Skellysolve B.

Example 9.—7α-methyl-5(10)-estrene-3,17-dione (X)

A mixture of 10 g. of 7α-methyl-3,17-dioxo-4-androsten-19-oic acid (IX) (prepared as in Example 8) and 10 ml. of pyridine is stirred at 50° C. for 1 hour and then concentrated with a rotary evaporator at about 40° C. The residue obtained is purified by recrystallization from acetone-Skellysolve B (or by chromatography on Florisil) to give 7α-methyl-5(10)-estrene-3,17-dione (X).

Example 10.—7α-methyl-5(10)-estrene-3,17-dione 3-dimethyl ketal (XI)

To a solution of 5 g. of malonic acid in 150 ml. of methanol, 10 g. of 7α-methyl-5(10)-estrene-3,17-dione (X) (prepared as in Example 9) is added with stirring at 20 to 25° C. After keeping the reaction mixture at this temperature for between about 6 to 8 hours (while following the rate of reaction by thin layer chromatography) it is poured into ice water, saturated with sodium bicarbonate and then extracted with ether. The extract is washed with sodium bicarbonate solution, filtered and the solvent removed by evaporation. The product (XI) is recrystallized from acetone hexane mixtures or chromatographed on Florisil to yield 7α-methyl-5(10)-estrene-3,17-dione 3-dimethyl ketal (XI).

Following the procedure of Example 10 but substituting for methanol, the following alkanols:

(1) ethanol
(2) n-propanol and
(3) n-butanol, yields, respectively:

(1) 7α-methyl-5(10)-estrene-3,17-dione 3-diethyl ketal (XI),
(2) 7α-methyl-5(10)-estrene-3,17-dione 3-di-n-propyl ketal (XI) and
(3) 7α-methyl-5(10)-estrene-3,17-dione 3-di-n-butyl ketal (XI).

Example 11.—7α-methyl-17β-hydroxy-17α-ethynyl-5(10)-estren-3-one 3-dimethyl ketal (XII)

A solution of 4 g. of 7α-methyl-5(10)-estrene-3,17-dione 3-dimethyl ketal (XI) (prepared as in Example 10) is dissolved in 300 ml. of ether and 20 ml. of toluene, cooled to 0° C. and acetylene bubbled through the solution. A solution of 60 ml. of sodium t-amyloxide in toluene-t-amylalcohol is added dropwise. The solution is kept at 0° C. with acetylene bubbling through it for about 15 hours, then poured into a solution of ammonium chloride kept at -5° C. and extracted with ether. The ether extract is washed with cold ammonium chloride solution and dried. the solvent is removed and the residue recrystallized from ether or a mixture of ether and hexane (or purified on Florisil) to yield 7α-methyl-17β-hydroxy-17α-ethynyl-5(10)-estren-3-one 3-dimethyl ketal (XII).

Following the procedure of Example 11 but substituting for acetylene the following:

(1) methylacetylene,
(2) chloroacetylene and
(3) trifluoromethylacetylene, yields, respectively:

(1) 7α-methyl - 17β - hydroxy-17α(1-propynyl)-5(10)-estren-3-one dimethyl ketal (XII),
(2) 7α-methyl - 17β-hydroxy-17α-chloroethynyl-5(10)-estren-3-one 3-dimethyl ketal (XII) and
(3) 7α-methyl - 17β - hydroxy-17α-trifluoromethylethynyl-5(10)-estren 3-dimethyl ketal (XII).

Example 12.—7α-methyl-17β-hydroxy-17α-ethynyl-5(10)-estren-3-one 3-dimethyl ketal (XII)

A suspension of sodium acetylide (20% in xylene) is centrifuged and the sludge slurried with 10 ml. dimethylsulfoxide. A mixture of 2 g. of 7α-methyl-5(10)-estren-3,17-dione 3-dimethyl ketal (XII) (obtained as in Example 10) in 10 ml. of dimethyl-suffoxide is mixed with the sodium acetylide. After keeping the mixture at room temperature for about a half hour, it is stored for about 16 hours. Water is added to the mixture and the product extracted with ether. The extracts are washed with dilute acid, sodium bicarbonate and water, and the solvent removed to give an oily residue. The residue is chromatographed through neutral alumina; recrystallization of the crude product gives pure 7α-methyl-17β- hydroxy-17α-ethynyl-5(10)-estren-3-one 3-dimethyl ketal (XII).

Following the procedure of Example 12 but substituting the following acetylides for sodium acetylide:

(1) sodium methylacetylide,
(2) sodium chloroacetylide and
(3) sodium trifluoromethylacetylide, yields, respectively:

(1) 7α-methyl - 17β - hydroxy-17α(1-propynyl)-5(10)-estren-3-one 3-dimethyl ketal (XII),
(2) 7α - methyl-17β-hydroxy-17α-chloroethynyl-5(10)-estren-3-one 3-dimethyl ketal (XII) and
(3) 7α - methyl - 17β - hydroxy - 17α-trifluoromethylethynyl-5(10)-estren-3-one 3-dimethyl ketal (XII).

Example 13.—7α-methyl-17β-hydroxy-17α-ethyl-5(10)-estren-3-one 3-dimethyl-ketal (XII)

A catalyst comprising a suspension of 100 g. of 1% palladium-on-charcoal in 30 ml. of dioxane (purified by passage through a column of neutral alumina) is reduced at atmospheric pressure with hydrogen. A solution of 0.4 g. of 7α - methyl - 17β - hydroxy-17α-ethynyl-5(10)-estren-3-one 3-dimethyl ketal (XII) (prepared as in Examples 11 and 12) in 5 ml. of dioxane is injected into the reaction flask through a rubber stopper. Hydrogenation is continued until 2 moles of hydrogen (66.5 mls.) are consumed at atmospheric pressure. The catalyst is removed by filtration and the filtrate concentrated to dryness on a rotary evaporator. The residue is chromatographed on a column of 125 g. of Florisil. The eluted material is recrystallized from aqueous methanol to give 7α - methyl - 17β-hydroxy-17α-ethyl-5(10)-estren-3-one 3-dimethyl ketal (XII).

Following the procedure of Example 13 but substituting for 7α-methyl-17β-hydroxy-17α ethynyl-5(10)-estren-3-one 3-dimethyl ketal (XII) the following representative starting materials:

(1) 7α-methyl-17β-hydroxy-17α(1-propynyl)-5(10)-estren-3-one 3-dimethyl ketal (XII) and
(2) 7α-methyl-17β-hydroxy-17α-trifluoromethylethynyl-5(10)-estren-3-one 3-dimethyl ketal (XII), yields, respectively, (1) 7α - methyl - 17β - hydroxy-17α(1-propyl)-5(10)-estren-3-one 3-dimethyl ketal (XII) and
(2) 7α - methyl - 17β - hydroxy-17α-(3,3,3-trifluoropropyl)-5(10)-estren-3-one 3-dimethyl ketal (XII).

Example 14.—7α-methyl-17β-hydroxy-17α-vinyl-5(10)-estren-3-one 3-dimethyl ketal (XII)

A catalyst comprising a suspension of 100 g. of 1% palladium-on-charcoal in 30 ml. of pyridine is reduced at atmospheric pressure with hydrogen. A solution of 0.4 g. of 7α-methyl-17β-hydroxy-17α-ethynyl-5(10)-estren-3-one 3-dimethyl ketal (XII) (prepared as in Examples 11 and 12) in 5 ml. of pyridine is added to the reaction flask. Hydrogenation is continued until 1 mole of hydrogen (33.25 mls.) is consumed at atmospheric pressure. The catalyst is removed by filtration and the filtrate concentrated to dryness on a rotary evaporator. The residue is chromatographed on a column of 125 g. of Florisil. The eluted material is recrystallized from aqueous methanol to give 7α-methyl-17β-hydroxy-17α-vinyl-5(10)-estren-3-one 3-dimethyl ketal (XII).

Following the procedure of Example 14 but substituting for 7α - methyl-17β-hydroxy-17α-ethynyl-5(10)-estren-3-one 3-dimethyl ketal (XII) the following representative starting materials:

(1) 7α-methyl-17β-hydroxy-17α(1-propynyl)-5(10)-estren-3-one 3-dimethyl ketal (XII) and
(2) 7α-methyl-17β-hydroxy-17α-trifluoromethylethynyl-5(10)-estren-3-one 3-dimethyl ketal (XII), yields, respectively, (1) 7α-methyl - 17β - hydroxy-17α(1-propenyl)-5(10)-estren-3-one 3-dimethyl ketal (XII) and
(2) 7α - methyl - 17β - hydroxy-17α-(3,3,3-trifluoro-1-propenyl)-5(10)-estren-3-one 3-dimethyl ketal (XII).

Example 15.—7α,17α-dimethyl-17β-hydroxy-5(10)-estren-3-one 3-dimethyl ketal (XII)

A solution of 2 g. of 7α-methyl-5(10)-androstene-3,17-dione 3-dimethyl ketal (XII) (prepared as in Example 10) and 100 ml. of 2 N methylmagnesium bromide in a mixture of equal volumes of benzene and tetrahydrofuran, is heated under reflux for about 18 hours. Most of the solvent is evaporated with a stream of nitrogen. The concentrate is poured into ice-water, acidified with dilute hydrochloric acid and immediately extracted with ether. The extract is washed with sodium bicarbonate solution, water, dried and the solvent removed. It is chromatographed through a column of 150 g. neutral alumina. Unreacted starting material (XII) is eluted first. The desired product is then eluted and crystallized from aqueous acetone to give 7α,17α-dimethyl-17β-hydroxy-5(10)-estren-3-one 3-dimethyl ketal (XII).

Following the procedure of Example 15 but substituting for methylmagnesium bromide, the following Grignard reagents:

(1) ethylmagnesium bromide (or chloride),
(2) n-propylmagnesium bromide (or chloride),
(3) i-propylmagnesium bromide (or chloride), and
(4) n-butylmagnesium bromide (or chloride), yields, respectively, (1) 7α-methyl - 17α - ethyl-17β-hydroxy-5(10)-estren-3-one 3-dimethyl ketal (XII),
(2) 7α - methyl-17α-n-propyl - 17β - hydroxy-5(10)-estren-3-one 3-dimethyl ketal (XII),
(3) 7α - methyl-17α-i-propyl - 17β - hydroxy-5(10)-estren-3-one 3-dimethyl ketal (XII) and
(4) 7α - methyl-17α-n-butyl - 17β - hydroxy-5(10)-estren-3-one 3-dimethyl ketal (XII).

Example 16.—7α-methyl-17β-hydroxy-17α-ethynyl-5(10)-estren-3-one (XIII)

To a solution of 1 g. of 7α-methyl-17β-hydroxy-17α-ethynyl-5(10)-estren-3-one 3-dimethyl ketal (XII) (prepared as in Examples 11 and 12) in 20 ml. of acetone, a solution of 0.4 g. of malonic acid in 6 ml. of water and 20 ml. of acetone is added. After between about 3 to about 5 hours at room temperature ether is added; the ether extract is washed with water, saturated sodium bicarbonate solution, again with water and dried over sodium sulfate. The solvent is removed leaving a residue of the product (XIII). It is recrystallized from a mixture of acetone and Skellysolve B, or alternatively purified by chromatography on a column of Florisil followed by recrystallization from acetone-Skellysolve B, until the product, 7α-methyl-17β-hydroxy-17α-ethynyl-5(10)-estren-3-one (XIII) reaches a melting point of 157 to 162° C.

Following the procedure of Example 16 but substituting for 7α - methyl-17β-hydroxy-17α-ethynyl-5(10)-estren-3-one 3-dimethyl ketal (XII) the following representative starting materials:

(1) 7α-methyl-17β-hydroxy-17α(1-propynyl)-5(10)-estren-3-one 3-dimethyl ketal (XII),
(2) 7α-methyl-17β-hydroxy-17α-chloroethynyl-5(10)-estren-3-one 3-dimethyl ketal (XII) and
(3) 7α-methyl-17β-hydroxy-17α-trifluoromethylethynyl-5(10)-estren-3-one 3-dimethyl ketal (XII), yields, respectively, (1) 7α-methyl - 17β - hydroxy-17α(1-propynyl)-5(10)-estren-3-one (XIII),
(2) 7α - methyl - 17β - hydroxy-17α-chloroethynyl-5(10)-estren-3-one (XIII) and
(3) 7α - methyl - 17β - hydroxy - 17α-trifluoromethylethynyl-5(10)-estren-3-one (XIII).

Example 17.—7α-methyl-17β-hydroxy-17α-ethyl-5(10)-estren-3-one (XIII)

Following the procedure of Example 16 but substituting 7α - methyl - 17β - hydroxy-17α-ethyl-5(10)-estren-3-one 3-dimethyl ketal (XII) (prepared as in Example 13) as starting material, yields 7α-methyl-17β-hydroxy-17α-ethyl-5(10)-estren-3-one (XIII).

Example 18.—7α,17α-dimethyl-17β-hydroxy-5(10)-estren-3-one (XIII)

Following the procedure of Example 16 but substituting 7α,17α - dimethyl - 17β - hydroxy-5(10)-estren-3-one 3-dimethyl ketal (XII) (prepared as in Example 15) as starting material, yields 7α,17α-dimethyl-17β-hydroxy-5(10)-estren-3-one (XIII).

Example 19.—7α-methyl-17β-hydroxy-17α-vinyl-5(10)-estren-3-one (XIII)

Following the procedure of Example 16 but substituting 7α - methyl - 17β - hydroxy-17α-vinyl-5(10)-estren-3-one 3-dimethyl ketal (XII) (prepared as in Example 14) as starting material, yields 7α-methyl-17β-hydroxy-17α-vinyl-5(10)-estren-3-one (XIII).

Following the procedure of Example 19 but substituting for 7α-methyl-17β-hydroxy-17α-vinyl-5(10)-estren-3-one 3-dimethyl ketal (XII) the following representative starting materials:

(1) 7α-methyl-17β-hydroxyl-17α(1-propenyl)-5(10)-estren-3-one 3-dimethyl ketal (XII) and
(2) 7α-methyl-17β-hydroxy-17α-chloroethenyl-5(10)-estren-3-one 3-dimethyl ketal (XII), yields, respectively, (1) 7α - methyl - 17β - hydroxy - 17α(1 - propenyl)-5(10)-estren-3-one (XIII) and
(2) 7α - methyl - 17β - hydroxy - 17α - chloroethenyl-5(10)-estren-3-one (XIII).

Example 20.—7α-methyl-19-nor-17β-hydroxy-17α-ethynyl-4-androsten-3-one (XVI)

To a solution of 0.3 g. of 7α-methyl-17β-hydroxy-17α-ethynyl-5(10)-estren-3-one (XIII) (prepared as in Example 13) in 5 ml. of methanol and 1 ml. of water, 1 ml. of 2 N hydrochloric acid is added. After stirring for about 18 hours or until the reaction is complete as determined by thin layer chromatography, the reaction mixture is diluted with water and extracted with methylene chloride. The extract is washed with saturated sodium bicarbonate solution, water, dried over magnesium sulfate, the solvent removed by evaporation and the residue crystallized from acetone-Skellysolve B to give 7α-methyl-19-nor-17β-hydroxy-17α-ethynyl - 4 - androsten-3-one (XVI) melting at 196 to 199° C.

Following the procedure of Example 20 but substituting for 7α-methyl-17β-hydroxy-17α-ethynyl-5(10)-estren-3-one (XIII) the following representative starting materials:

(1) 7α - methyl - 17β - hydroxy-17α(1-propynyl)-5(10)-estren-3-one (XIII),
(2) 7α - methyl - 17β - hydroxy - 17α-chloroethynyl-5(10)-estren-3-one (XIII) and
(3) 7α - methyl - 17β - hydroxy - 17α - trifluoromethylethynyl-5(10)-estren-3-one (XIII), yields, respectively, (1) 7α - methyl - 19 - nor - 17β - hydroxy - 17α(1-propynyl)-4-androsten-3-one (XVI),
(2) 7α - methyl - 19 - nor - 17β - hydroxy - 17α-chloroethynyl-4-androsten-3-one (XVI) and
(3) 7α - methyl - 19 - nor - 17α - trifluoromethylethynyl-4-androsten-3-one (XVI).

Example 21.—7α-methyl-19-nor-17β-hydroxy-17α-ethyl-4-androsten-3-one (XVI)

Following the procedure of Example 20 but substituting 7α - methyl - 17β - hydroxy - 17α - ethyl - 5(10) - estren-3-one (XIII) (prepared as in Example 17) as starting material, yields 7α-methyl-19-nor-17β-hydroxy-17α-ethyl-4-androsten-3-one (XVI).

Example 22.—7α,17α-dimethyl-19-nor-17β-hydroxy-4-androsten-3-one (XVI)

Following the procedure of Example 20 but substituting 7α,17α - dimethyl-17β-hydroxy-5(10)-estren-3-one (XIII) (prepared as in Example 18) as starting material, yields 7α,17α-dimethyl-19-nor-17β-hydroxy-4-androsten-3-one (XVI).

Example 23.—7α-methyl-17β-hydroxy-17α-vinyl-4-androsten-3-one (XVI)

Following the procedure of Example 20 but substituting 7α - methyl-17β-hydroxy-17α-vinyl-5(10)-estren-3-one (XIII) (prepared as in Example 19) as starting material, yields 7α-methyl-19-nor-17β-hydroxy-17α-vinyl-4-androsten-3-one (XVI).

Following the procedure of Example 23 but substituting for 7α-methyl-17β-hydroxy-17α-vinyl-5(10)-estren-3-one (XIII) the following representative starting materials:

(1) 7α-methyl - 17β-hydroxy - 17α(1-propenyl)-5(10)-estren-3-one (XIII) and
(2) 7α - methyl - 17β - hydroxy - 17α - (3,3,3-trifluoro-1-propenyl)-5(10)-estren-3-one (XIII), yields, respectively, (1) 7α - methyl - 19 - nor - 17β - hydroxy - 17α(1-propenyl)-4-androsten-3-one (XVI) and
(2) 7α - methyl - 19 - nor - 17β - hydroxy - 17α(3,3,3-trifluoro-1-propenyl)-4-androsten-3-one (XVI).

Example 24.—7α-methyl-19-nor-17β-hydroxy-17α-ethynyl-4-androsten-3-one (XVI)

A solution of 0.3 g. of 7α-methyl-17β-hydroxy-17α-ethynyl-5(10)-androsten-3-one 3-dimethyl ketal (XII) (prepared as in Examples 11 and 12) in 5 ml. of acetone is purged with nitrogen and 0.5 ml. of 2 N hydrochloric acid added. After about 18 hours the acid is neutralized with aqueous saturated sodium bicarbonate solution and the mixture is extracted with methylene chloride. The extract is washed with water, dried over magnesium sulfate, the solvent removed and the residue crystallized from acetone-Skellysolve B to give 7α-methyl-19-nor-17β-hydroxy-17α-ethynyl-4-androsten-3-one (XVI) melting at 196 to 199° C.

Following the procedure of Example 24 but substituting for 7α - methyl-17β-hydroxy-17α-ethynyl-5(10)-estren-3-one 3-dimethyl ketal (XII) the following representative starting materials:

(1) 7α - methyl - 17β - hydroxy - 17α(1 - propynyl)-5(10)-estren-3-one 3-dimethyl ketal (XII),
(2) 7α - methyl - 17β - hydroxy - 17α - chloroethynyl-5(10)-estren-3-one 3-dimethyl ketal (XII) and
(3) 7α - methyl - 17β - hydroxy - 17α - trifluoromethylethynyl-5(10)-estren-3-one 3-dimethyl ketal (XII), yields, respectively, (1) 7α - methyl - 19 - nor - 17β - hydroxy - 17α(1-propynyl)-4-androsten-3-one (XVI),
(2) 7α - methyl - 19 - nor - 17β - hydroxy - 17α - chloroethynyl-4-androsten-3-one (XVI) and
(3) 7α - methyl - 19 - nor - 17β - hydroxy - 17α - trifluoromethylethynyl-4-androsten-3-one (XVI).

Example 25.—7αmethyl-19-nor-17β-hydroxy-17α-ethyl-4-androsten-3-one (XVI)

Following the procedure of Example 24 but substituting 7α - methyl-17β-hydroxy-17α-ethyl-5(10)-estren-3- one 3-dimethyl ketal (XII) (prepared as in Example 13) as starting material, yields 7α-methyl-19-nor-17β-hydroxy-17α-ethyl-4-androsten-3-one (XVI).

Example 26.—7α,17α-dimethyl-19-nor-17β-hydroxy-4-androsten-3-one (XVI)

Following the procedure of Example 24 but substituting 7α,17α-dimethyl-5(10)-estren-3-one 3-dimethyl ketal (XII) (prepared as in Example 15) as starting material, yields 7α,17α-dimethyl-19-nor-17β-hydroxy-4-androsten-3-one (XVI).

Example 27.—7α-methyl-19-nor-17β-hydroxy-17α-vinyl-4-androsten-3-one (XVI)

Following the procedure of Example 24 but substituting 7α-methyl-17β-hydroxy-17α-vinyl-5(10-estren-3-one 3-dimethyl ketal (XII (prepared as in Example 14) as starting material, yields 7α-methyl-19-nor-17β-hydroxy-17β-vinyl-4-androsten-3-one (XVI).

Following the procedure of Example 27 but substituting for 7α-methyl-17β-hydroxy-17α-vinyl-5(10)-3-one 3-dimethyl ketal (XII) the following representative starting materials:

(1) 7α-methyl-17β-hydroxy-17α(1-propenyl)-5(10)-estren-3-one 3-dimethyl ketal (XII) and
(2) 7α-methyl-17β-hydroxy-17α-(3,3,3-trifluoro-1-propenyl)5(10)-estren-3-one 3-dimethyl ketal (XII), yields, respectively, (1) 7α-methyl-19-nor-17β-hydroxy-17α(1-propenyl)-4-androsten-3-one (XVI) and
(2) 7α-methyl-9-nor-17β-hydroxy-17α(3,3,3-trifluoro-1-propenyl)-4-androsten-3-one (XVI).

Example 28.—7α-methyl-19-nor-4-androstene-3,17-dione

To a solution of 10 g. of sodium dichromate dihydrate in 200 ml. of acetic acid is aded 20 g. of 7α-methyl-19-nor-17β-hydroxy-4-androsten-3-one (VII) (prepared in Example 6) with stirring and cooling in a cold water bath. The reaction mixture is allowed to stand for several hours and then poured into ca. 1 liter of water. The precipitate so formed is isolated by filtration, washed with water and dried. The material so obtained is recrystallized from a mixture of acetone and Skellysolve B. There is thus obtained 7α-methyl-19-nor-4-androstene-3,17-dione in the form of a crystalline solid.

Example 29.—7α-methyl-19-nor-17β-hydroxy-17α-ethynyl-4-androsten-3-one (XVI)

(A) 3-pyrrolidyl enamine of 7α-methyl-19-nor-4-androstene-3,17-dione.—To a solution of 15.6 g. of 7α-methyl-19-nor-4-androstene-3,17-dione in the minimum of boiling methanol is added 10 ml. of pyrrolidine in a nitrogen atmosphere. The mixture is cooled and the solid which separates isolated by filtration, washed with fresh methanol and ether and dried for about 15 minutes at 60° C. There is thus obtained the 3-pyrrolidyl enamine of 7α-methyl-19-nor-4-androstene-3,17-dione in the form of a crystalline solid.

(B) 7α-methyl-19-nor-17β-hydroxy-17α-ethynyl - 4-androsten-3-one (XVI).—While the 3-enamine, prepared as described in Part A above, is being dried, 25 ml. of a suspension (0.2 g./ml.) of sodium acetylide in xylene is centrifuged. The solid so isolated is suspended in 160 ml. of redistilled dimethyl-sulfoxide. To this suspension is added a slurry of the whole of the above enamine in 100 ml. of dimethylsulfoxide. The reaction mixture is stirred under an atmosphere of nitrogen for 3 hours after which time 30 ml. of water and 50 ml. of methanol are added The resulting mixture is heated to 50 to 60° C. for 1 hour and then stirred overnight at room temperature. The reaction mixture is then diluted with water and extracted with three 100 ml. portions of methylene chloride. The methylene chloride extracts are combined, washed with dilute hydrochloric acid and with water and then evaporated to dryness. The aqueous washings from the above extraction are combined and made basic by the addition of sodium hydroxide solution. The solution so obtained is extracted several times with methylene chloride and the combined methylene chloride extracts washed successively with dilute hydrochloric acid, dilute sodium carbonate and water before being dried over anhydrous sodium sulfate. The dried solution is filtered and the filtrate evaporated to dryness. An acetone solution of the material is treated with a mixture of decolorizing charcoal (Darco), diatomaceous earth (Celite) and magnesium silicate (Florisil). The mixture is filtered and the filtrate evaporated to dryness. The residue is recrystallized from a mixture of acetone and Skellysolve B. There is thus obtained 7α-methyl-19 - nor - 17β-hydroxy-17α-ethynyl-4-androsten-3-one (XVI) in the form of a crystalline solid.

Following the procedure of Example 29 but substituting the following acetylides for sodium acetylide:

(1) sodium methylacetylide and
(2) sodium bromoacetylide, yields, respectively, (1) 7α-methyl-19-nor-17β-hydroxy-17α(1-propynyl)-4-androsten-3-one (XVI) and
(2) 7α-19-nor-17β-hydroxy-17α-bromoethynyl-4-androsten-3-one (XVI).

Example 30.—7α-methyl-19-nor-17β-hydroxy-17α-ethyl-4-androsten-3-3-one (XVI)

Following the procedure of Example 13 but substituting 7α-methyl-19-nor-17β-hydroxy-17α-ethynyl-4-androsten-3-one (XVI) (prepared as in Example 29) as starting material, yields 7α-methyl-19-nor-17β-hydroxy-17α-ethyl-4-androsten-3-one (XVI).

Following the procedure of Example 30 but substituting for 7α-methyl-19-nor-17β-hydroxy-17α-ethynyl-4-androsten-3-one (XVI) the following representative starting materials:

(1) 7α - methyl-19-nor-17β-hydroxy-17α-propynyl-4-androsten-3-one (XVI) and
(2) 7α - methyl-19-nor-17β-hydroxy-17α-trifluoromethyl-ethynyl-4-androsten-3-one (XVI), yields, respectively, (1) 7α - methyl-19-nor-17β-hydroxy-17α-propyl-4-androsten-3-one (XVI) and
(2) 7α-methyl-19-nor-17β-hydroxy-17α-3',3',3'-trifluoropropyl-4-androsten-3-one (XVI).

Example 31.—7α-methyl-19-nor-17β-hydroxy-17α-vinyl-4-androsten-3-one (XVI)

Following the procedure of Example 14 but substituting 7α-methyl-19-nor-17β-hydroxy-17α-ethynyl-4-androsten-3-one (XVI) (prepared as in Example 29) as starting material, yields 7α-methyl-19-nor-17β-hydroxy-17α-vinyl-4-androsten-3-one (XVI).

Following the procedure of Example 31, but substituting for 7α-methyl-19-nor-17β-hydroxy-17α-ethynyl-4-androsten-3-one (XVI) the following representative starting materials:

(1) 7α-methyl - 19 - nor-17β-hydroxy-17α(1-propynyl)-4-androsten-3-one (XVI),
(2) 7α - methyl-19-nor-17β-hydroxy-17α-trifluoromethyl-ethynyl-4-androsten-3-one (XVI), yields, respectively, (1) 7α-methyl-19-nor-17β-hydroxy-17α(1-propenyl)-4-androsten-3-one (XVI),
(2) 7α - methyl-19-nor-17β-hydroxy-17α-3',3',3'-trifluoro-1-propenyl)-4-androsten-3-one (XVI).

Example 32.—7α-methyl-17β-hydroxy-5(10)-estren-3-one 17-acetate (XIV)

A mixture of 10 g. of 7α-methyl-3-oxo-17β-hydroxy-4-androsten-19-oic acid 17-acetate (VI) (prepared as in Example 5) and 10 ml. of pyridine is stirred at 50° C.

for 1 hour and then concentrated with a rotary evaporator at about 40° C. The residue obtained is purified by triturating with ether and filtering. Recrystallization from acetone-Skellysolve B (or by chromatography on Florisil) gives 7α-methyl-17β-hydroxy-5(10)-estren-3-one 17-acetate (XIV).

Example 33.—7α-methyl-17β-hydroxy-5(10)-estren-3-one 17-acetate 3-dimethyl ketal (XV)

To a solution of 5 g. of malonic acid in 150 ml. of methanol, 10 g. of 7α-methyl-17β-hydroxy-5(10)-estren-3-one 17-acetate (XIV) (prepared as in Example 32) is added with stirring at 20 to 25° C. After keeping the reaction mixture at this temperature for between about 6 to 8 hours (while following the rate of reaction by thin layer chromatography) it is poured into ice water, saturated with sodium bicarbonate solution, and then extracted with ether. The extract is washed with sodium bicarbonate solution, filtered and the solvent removed by evaporation. The product (XV) is recrystallized from acetone-hexane mixtures or chromatographed on Florisil to yield 7α-methyl-17β-hydroxy-5(10)-estren-3-one 17-acetate 3-dimethyl ketal (XV).

Example 34.—7α-methyl-17β-hydroxy-5(10)-estren-3-one 3-dimethyl ketal

A solution prepared from 1 g. of 7α-methyl-17β-hydroxy-5(10)-estren-3-one 17-acetate 3-dimethyl ketal (XV) (prepared as in Example 33), 1 g. of potassium carbonate, 100 ml. of methanol and 15 ml. of water is mixed and purged with nitrogen; stirring is continued under nitrogen for about 4 hours at 25° C. The solution is then neutralized by addition of acetic acid and distilled under vacuum to remove the methanol. The residue is extracted with 100 ml. of methylene chloride and the extract dried over sodium sulfate to give a solution of 7α-methyl-17β-hydroxy-5(10)-estren-3-one 3-dimethyl ketal, which is freed of solvent by evaporation, and, if desired, purified further by recrystallization or chromatography over Florisil.

Example 35.—7α-methyl-5(10)-estrene-3,17-dione 3-dimethyl ketal (XI)

To a solution of 2 g. of chromium trioxide in 20 ml. of pyridine is added 2 g. of 7α-methyl-17β-hydroxy-5(10)-androsten-3-one 3-dimethyl ketal (prepared as in Example 34) with stirring and cooling. The reaction mixture allowed to stand for about 20 hours and then diluted with a mixture of equal parts of benzene and ether. The resulting mixture is filtered through a bed of Celite (diatomaceous earth). The filter bed is washed well with a mixture of equal parts of ether and benzene, then with water and finally with the mixed solvent. The filtrate and the organic layer of the washings are combined and washed several times with water. Each aqueous washing is back-extracted with a mixture of equal parts of ether and benzene. The combined organic layers are then dried and evaporated to dryness. The material thus obtained is recrystallized from a mixture of acetone and Skellysolve B to yield 7α-methyl-5(10)-estrene-3,17-dione 3-dimethyl ketal (XI).

Example 36.—7α-methyl-6β,17β-dihydroxy-5β-androstan-3-one 17-acetate (XVII)

Five-tenths of a gram of the product of Example 2, 7α-methyl-6β,17β-dihydroxy-4-androsten-3-one 17 - acetate (III), was dissolved in 50 ml. of 95% alcohol and hydrogenated with 0.1 g. of 5% palladium on charcoal catalyst in a Parr apparatus. After removing the catalyst by filtration and concentrating the solvent to dryness, the product was crystallized first from ether, then from a mixture of acetone and Skellysolve B to give 7α-methyl-6β,17β-dihydroxy-5β-androstan-3-one 17-acetate (XVII) melting at 182 to 184° C. Optical rotatory dispersion data substantiates the 5β-hydrogen configuration; infrared and ultraviolet spectra support the assigned structure.

Following the hydrolysis procedure of Example 34 but substituting 7α-methyl-6β,17β-dihydroxy-5β-androstan-3-one 17-acetate (XVII) gives the corresponding 17-free alcohol.

Example 37.—7α-methyl-6β,19-epoxy-17β-hydroxy-5β-androstan-3-one 17-acetate (XVIII)

A mixture of 2 g. of 7α-methyl-6β,17β-dihydroxy-5β-androstan-3-one 17-acetate (XVII) (prepared as in Example 36), 2.68 g. of calcium carbonate, 2.2 g. of iodine and 9 g. of lead tetraacetate (dried by washing with ether followed by heating in a vacuum oven at 60° C. for 1 hour) in 275 ml. of cyclohexane, was heated at reflux for 3.5 hours, cooled and filtered. The filtrate was washed with water, dried over magnesium sulfate and concentrated to dryness. The residue was dissolved in 200 ml. of absolute ethanol and stirred with 5 g. of zinc dust and 10 drops of acetic acid. After 1.5 hours the zinc was removed by filtration, the filtrate diluted with water and the crude product isolated with ether. It was crystallized from ether to give 0.6 g. of material melting at 160 to 178° C. The mother liquor residue still gave a positive Beilstein test and was stirred again with zinc dust and acetic acid. This material was combined with the crude product and chromatographed through a column of Florisil. The main band eluted gave the desired product (XVIII). It was recrystallized from a mixture of acetone and Skellysolve B to give 0.8 g. of 7α-methyl-6β,19-epoxy-17β-hydroxy-5β-androstan-3-one 17-acetate (XVIII) melting at 187 to 188° C. Infrared and nuclear magnetic resonance spectra support the proposed structure.

Analysis.—Calcd. for $C_{22}H_{32}O_4$ (percent): C, 73.70; H, 8.95. Found (percent): C, 73.26; H, 9.19.

Following the hydrolysis procedure of Example 34 but substituting 7α-methyl-6β,19-epoxy-17β-hydroxy-5β-androstan-3-one 17-acetate (XVIII) gives the corresponding 17-free alcohol.

Example 38.—7α-methyl-6β,19-epoxy-17β-hydroxy-5β-androstan-3-one 17-acetate (XVIII)

(a) A solution of 1 g. of 7α-methyl-6β,17β-dihydroxy-5β-androstan-3-one 17-acetate (XVII) (prepared as in Example 36), 50 mg. of paratoluenesulfonic acid and 7 ml. of ethylene glycol was stirred and refluxed through a Dean Stark trap under nitrogen for about 1.25 hours. The solution was washed with dilute sodium bicarbonate solution, brine, dried over magnesium sulfate and concentrated to dryness. The product, 7α-methyl-6β,17β-dihydroxy-5β-androstan-3-one 3-ethylene ketal 17-acetate, appeared as one spot by thin layer chromatography.

(b) The product from (a), above, was dissolved in 140 ml. of cyclohexane and 1.34 g. of calcium carbonate, 1.1 g. of iodine and 4.5 g. of lead tetraacetate added. The mixture was refluxed for about 50 minutes, cooled, filtered, washed first with water, then with sodium thiosulfate solution, water, dried and the solvent removed to leave the crude product, 7α-methyl-6β,19-epoxy-17β-hydroxy-5β-androstan-3-one 3-ethylene ketal 17-acetate.

(c) The product from (b), above, was dissolved in 25 ml. of 70% acetic acid and heated on a steam bath for about 1.5 hours. The solution was concentrated to a volume of about 10 ml. in a rotary evaporator. The product was precipitated by the addition of water, filtered dried and recrystallized from aceton-Skellysolve B to give 0.39 g. of 7α-methyl-6β,19-epoxy-17β-hydroxy-5β-androstan-3-one 17-acetate (XVIII), identical with the compound prepared in Example 37.

Example 39.—7α-methyl-2β-bromo-6β,19-epoxy-17β-hydroxy-5β-androstan-3-one 17-acetate (XIX)

A bromine solution was prepared by mixing 1.25 ml. of a solution containing 7 g. of bromine in 50 ml. of acetic acid and 1 ml. of a solution containing 3.5 g. of sodium acetate in 50 ml. of acetic acid. This solution was added dropwise as rapidly as the bromine was consumed to a solution of 0.36 g. of 7α-methyl-6β,19-epoxy-17β-hydroxy- 5β-androstan-3-one 17-acetate (XVIII) (prepared as in Examples 37 and 38) and 10 mg. of paratoluenesulfonic acid in 4 ml. of acetic acid. The addition required only a few minutes. Water was added and the precipitated product (XIX) collected, washed with water, dried and recrystallized from a mixture of acetone and Skellysolve B to give 0.35 g. of 7α-methyl-2β-bromo-6β,19-epoxy-17β-hydroxy-5β-androstan-3-one 17-acetate (XIX), melting at 213 to 220° C. and having a rotation [α]_D—22° (chloroform).

Analysis.—Calcd. for $C_{22}H_{31}O_4Br$ (percent): Br, 18.19. Found (percent): Br, 19.78.

Example 40.—7α-methyl-6β,19-epoxy-17β-hydroxy-5β-androst-1-en-3-one 17-acetate (XX)

A mixture of 0.25 g. of 7α-methyl-2β-bromo-6β,19-epoxy-17β-hydroxy-5β-androstan-3-one 17-acetate (XIX) (prepared as in Example 39) in 10 ml. of dimethylformamide, 0.23 g. of lithium chloride and 0.13 g. of lithium carbonate was heated and stirred on a steam bath under nitrogen for about 1 hour, then refluxed for about 1 hour. The mixture was cooled, diluted with ether, washed successively with water, dilute hydrochloric acid, again with water and dried. The solvent was removed leaving a crystalline residue. It was recrystallized twice from acetone-Skellysolve B to give 50 mg. of 7α-methyl-6β,19-epoxy-17β - hydroxy - 5β - androst-1-en-3-one 17-acetate (XX), melting at 261 to 262° C. and $\lambda_{max}^{alc.}$ 229 mμ ( ε =8,900)

Infrared and nuclear magnetic resonance spectra confirm the proposed structure.

Analysis.—Calcd. for $C_{22}H_{30}O_4$ (percent): C, 73.71; H, 8.44. Found (percent): C, 73.45; H, 8.40.

Following the hydrolysis procedure of Example 34 but substituting 7α-methyl - 6β,19 - epoxy-17β-hydroxy-5β-androst-1-en-3-one 17-acetate (XX) gives the corresponding 17 free alcohol (XXI).

We claim:
1. The compound 7α-methyl-6β,19-epoxy-17β-hydroxy-5β-androstan-3-one 17-acetate.
2. A 7α-methyl-2β-bromo-6β,19-epoxy - 17β - hydroxy-5β-androstan-3-one 17-acylate compound of the formula

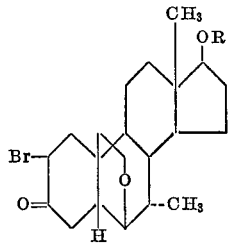

wherein the 1,2–4,5-carbon atom linkages are single bonds and R is the acyl radical of a hydrocarbon carboxylic acid containing from 1 to 12 carbon atoms.

3. The compound wherein R is acetyl, the 1,2- and 7α-methyl - 2β - bromo - 6β,19 - epoxy - 17β - hydroxy - 5β-androstan-3-one 17-acetate.
4. A compound of the formula

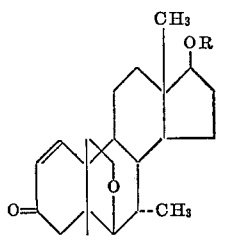

wherein R is selected from the group consisting of hydrogen and the acyl radical of a hydrocarbon carboxylic acid containing from 1 to 12 carbon atoms.

5. The compound 7α-methyl-6β,19-epoxy-17β-hydroxy 5β-androstan-1-en-3-one 17-acetate.
6. The compound 7α-methyl-5(10)-estrene-3-dimethoxy-17-one of the formula

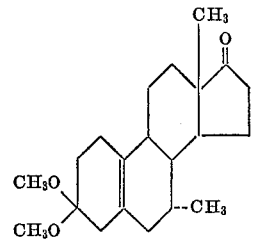

7. A compound having the formula

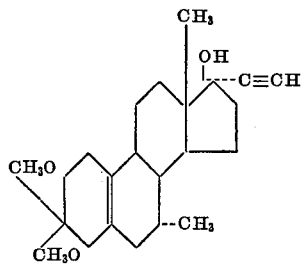

8. A process for the production of the compound of the Formula VII

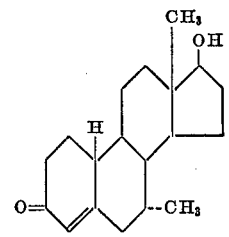

(VII)

which comprises:
(1) treating the compound of the Formula I

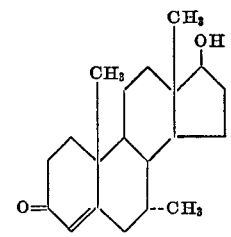

(I)

with an acylating agent to obtain a compound of the Formula II

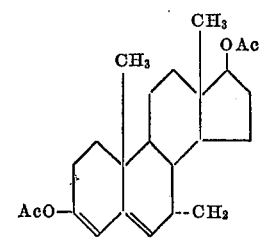

(II)

wherein Ac is the acyl radical of an organic carboxylic acid containing from one to twelve carbon atoms, inclusive;

(2) treating a thus produced compound of Formula II with an organic peracid to yield a compound of the Formula III

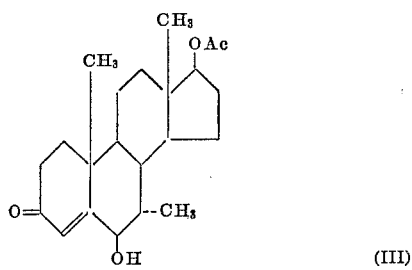

(III)

wherein in Ac has the same meaning as above;
(3) treating a thus produced compound of Formula III with lead tetraacetate in the presence of a catalyst to give a compound of the Formula IV

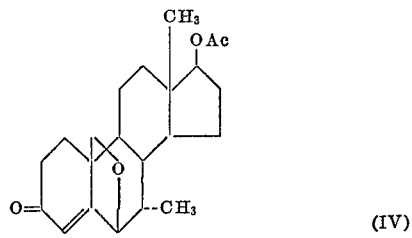

(IV)

wherein in Ac has the same meaning as above;
(4) treating with a reducing agent a thus produced compound of the Formula IV to yield a compound of the Formula V

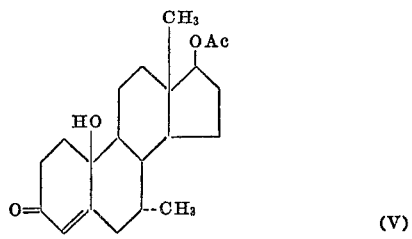

(V)

wherein Ac has the same meaning as above;
(5) treating with an oxidizing agent a thus produced compound of Formula V to give a compound of the Formula VI

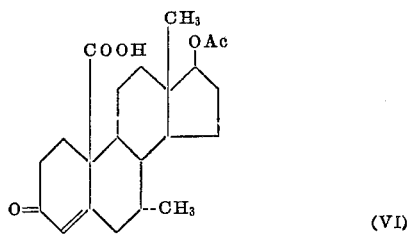

(VI)

wherein Ac has the same meaning as above;
(6) decarboxylating the 19-group of a thus produced compound of Formula VI to yield a compound of the Formula VIIa

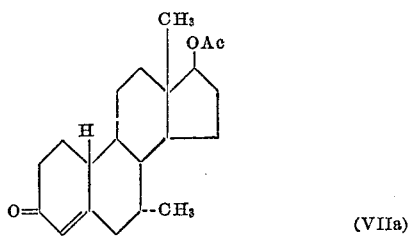

(VIIa)

wherein AC has the same meaning as above;
(7) hydrolyzing the acyl group at the 17β-position of a thus produced compound of Formula VIIa to give the compound of Formula VII, above.

9. A process for the production of the compound of the Formula VII

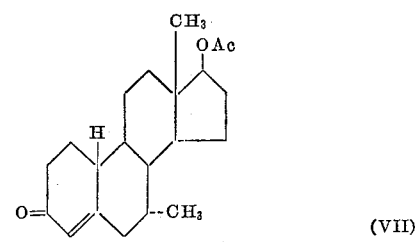

(VII)

wherein Ac is the acyl radical of an organic carboxylic acid containing from one to twelve carbon atoms, which comprises decarboxylating the 19-group of a compound of the Formula VI

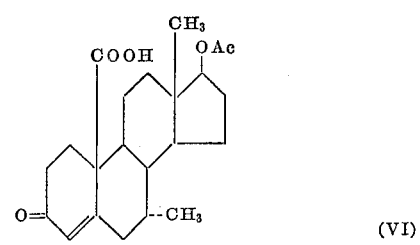

(VI)

wherein Ac has the same meaning as above.

10. A process for the production of a compound of the Formula VIII

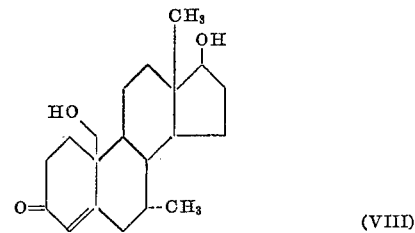

(VIII)

which comprises:
(1) treating the compound of the Formula I

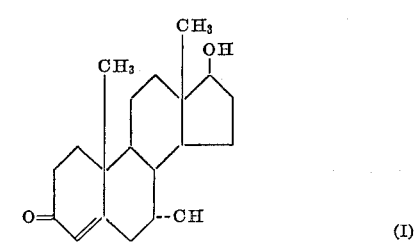

(I)

with an acylating agent to obtain a compound of the Formula II

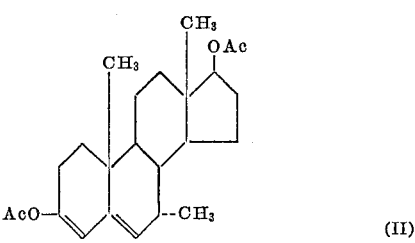

(II)

wherein Ac is the acyl radical of an organic carboxylic acid containing from one to twelve carbon atoms, inclusive;

(2) treating a thus produced compound of Formula II with an organic peracid to yield a compound of the Formula III

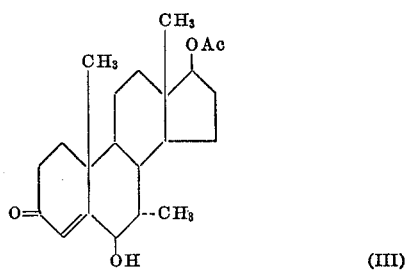
(III)

wherein Ac has the same meaning as above;
(3) treating a thus produced compound of Formula III with lead tetraacetate in the presence of a catalyst to give a compound of the Formula IV

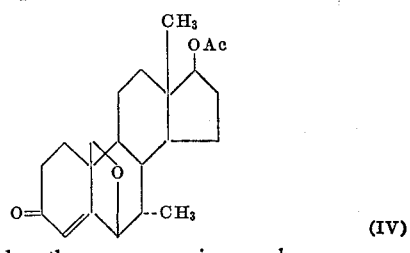
(IV)

wherein Ac has the same meaning as above;
(4) treating with a reducing agent a thus produced compound of Formula IV to yield a compound of the Formula V

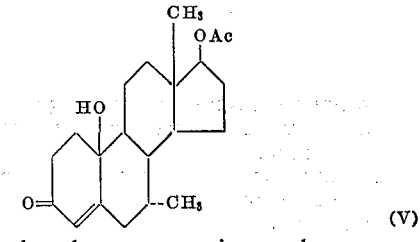
(V)

wherein Ac has the same meaning as above;
(5) hydrolyzing the acyl group at the 17β-position of a thus produced compound of Formula V to give the compound of Formula VIII, above.

11. A process for the production of the compound of the formula

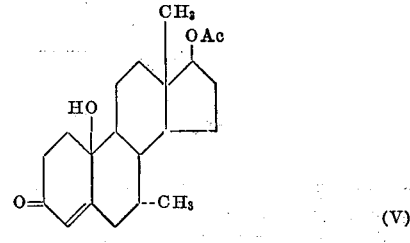
(V)

wherein Ac is the acyl radical of an organic carboxylic acid containing from 1 to 12 carbon atoms, inclusive, which comprises treating with a reducing agent a compound of the Formula IV

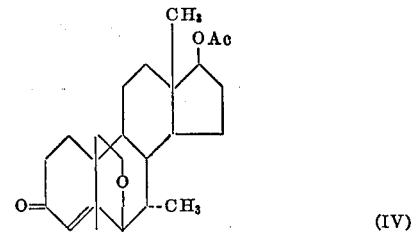
(IV)

wherein Ac has the same meaning as above.

12. A process for the production of the compound of the Formula XVI

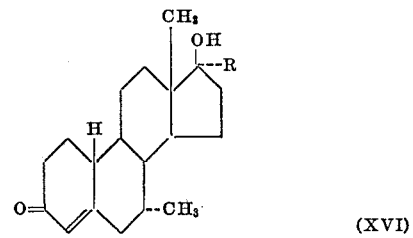
(XVI)

wherein R is selected from the group consisting of alkyl, alkenyl and alkynyl, which comprises:
(1) treating the compound of the Formula I

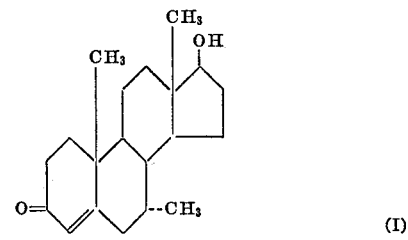
(I)

with an acylating agent to obtain a compound of the Formula II

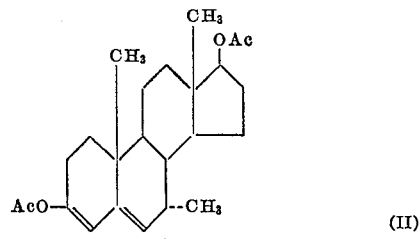
(II)

wherein Ac is the acyl radical of an organic carboxylic acid containing from one to twelve carbon atoms, inclusive;
(2) treating a thus produced compound of Formula II with an organic peracid to yield a compound to the Formula III

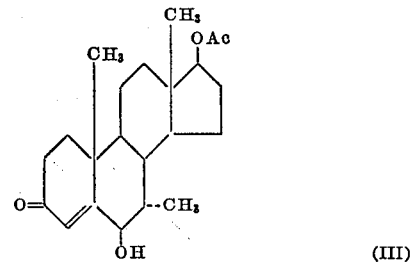
(III)

wherein Ac has the same meaning as above;
(3) treating a thus produced compound of Formula III with lead tetraacetate in the presence of a catalyst to give a compound of the Formula IV

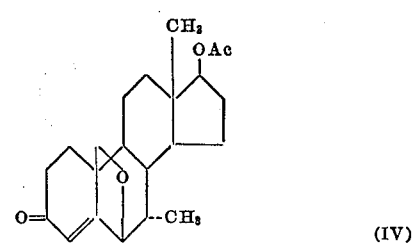
(IV)

wherein Ac has the same meaning as above;

(4) treating with a reducing agent a thus produced compound of Formula IV to yield a compound of the Formula V

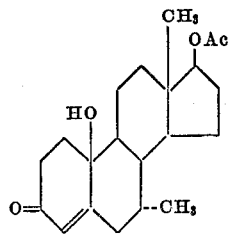

(V)

wherein Ac has the same meaning as above;
(5) treating at the 19-position with an oxidizing agent a thus produced compound of Formula V to give a compound of the Formula VI

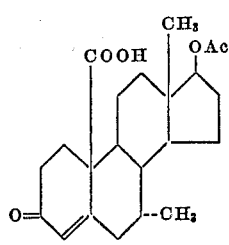

(VI)

wherein Ac has the same meaning as above;
(6) decarboxylating the 19-group of a thus produced compound of Formula VI to yield a compound of the Formula VIIa

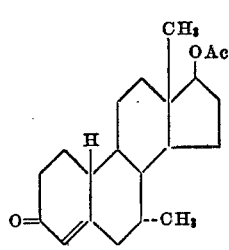

(VIIa)

wherein Ac has the same meaning as above;
(7) hydrolyzing the acyl group at the 17β-position of a thus produced compound of Formula VIIa to give the compound of the Formula VII

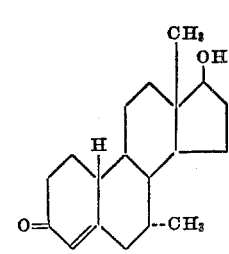

(VII)

(8) oxidizing at the 17β-position the thus produced compound of Formula VII to yield the compound of the Formula VIIb

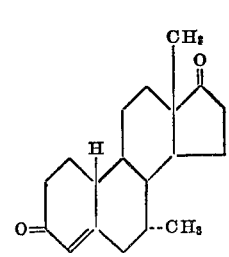

(VIIb)

(9) treating the thus produced compound of Formula VIIb with a secondary cyclic alkyleneamine to give a compound of the Formula VIIc

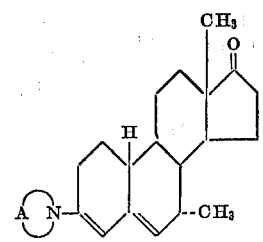

(VIIc)

wherein A is an alkylene group, which together with the attached nitrogen atom, forms a ring containing from five to six members, inclusive;
(10) treating a thus produced compound of Formula VIIc with an alkylating agent selected from the group consisting of alkylmagnesium halides, alkenylmagnesium halides, alkynylmagnesium halides, alkyllithium, alkynyllithium and alkali metal derivatives of alkynes, to yield a corresponding compound of the Formula VIId

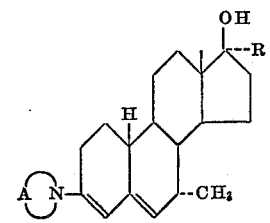

(VIId)

wherein A has the same meaning as in Formula VIIc, above, and R has the same meaning as in Formula XVI, above;
(11) hydrolyzing the 3-enamine group of a thus produced compound of Formula VIId to obtain a corresponding compound of Formula XVI, above.

13. A process for the production of a compound of the Formula XVI

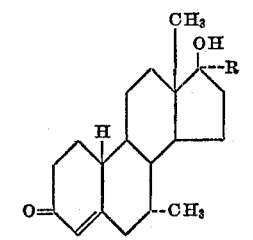

(XVI)

wherein R is selected from the group consisting of alkyl, alkenyl and alkynyl, which comprises:
(1) decarboxylating the 19-group of a compound of the Formula VI

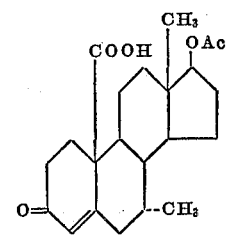

(VI)

wherein Ac is the acyl radical of an organic carboxylic acid containing from one to twelve carbon atoms, inclusive, to yield a compound of the Formula VIIa

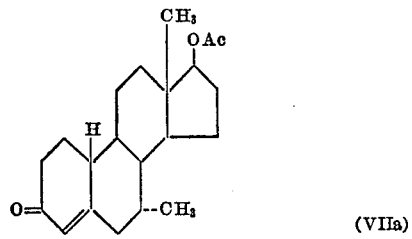
(VIIa)

wherein Ac has the same meaning as above;

(2) hydrolyzing the acyl group at the 17β-position of a thus produced compound of Formula VIIa to give a compound of the Formula VII

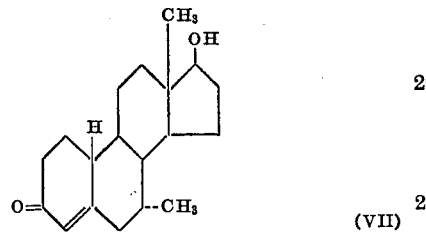
(VII)

(3) oxidizing at the 17-position the thus produced compound of Formula VII to yield the compound of the Formula VIIb

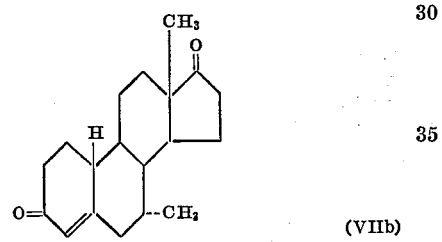
(VIIb)

(4) treating the thus produced compound of Formula VIIb with a secondary cyclic alkyleneamine to give a compound of the Formula VIIc

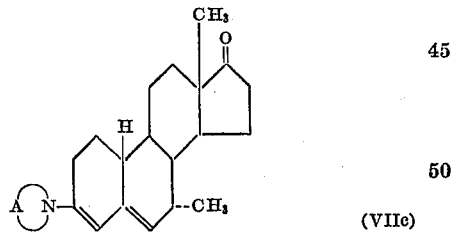
(VIIc)

wherein A is an alkylene group, which together with the attached nitrogen atom, forms a ring containing from five to six members, inclusive;

(5) treating a thus produced compound of Formula VIIc with an alkylating agent selected from the group consisting of alkylmagnesium halides, alkenylmagnesium halides, alkynylmagnesium halides, alkyllithium, alkynyllithium and alkali metal derivatives of alkynes, to yield a corresponding compound of the Formula VIId

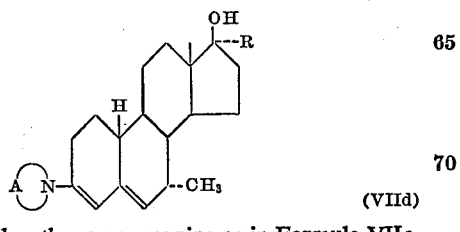
(VIId)

wherein A has the same meaning as in Formula VIIc, above. and R has the same meaning as in Formula XVI, above;

(6) hydrolyzing the 3-enamine group of a thus produced compound of Formula VIId to obtain a corresponding compound of Formula XVI, above.

14. A process for the production of a compound of the Formula XVI

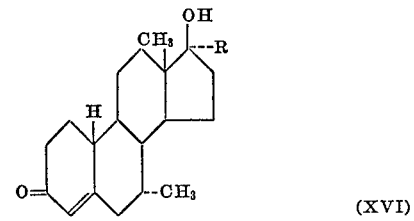
(XVI)

wherein R is selected from the group consisting of alkyl, alkenyl and alkynyl, which comprises:

(1) treating the compound of the Formula I

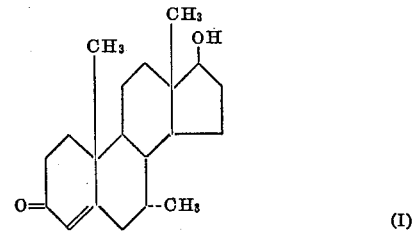
(I)

with an acylating agent to obtain a compound of the Formula II

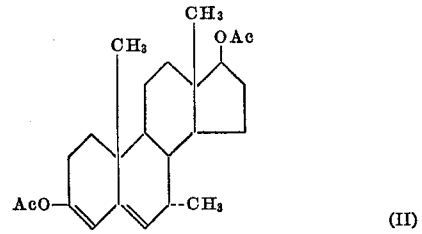
(II)

wherein Ac is the acyl radical of an organic carboxylic acid containing from one to twelve carbon atoms, inclusive;

(2) treating a thus produced compound of Formula II with an organic peracid to yield a compound of the Formula III

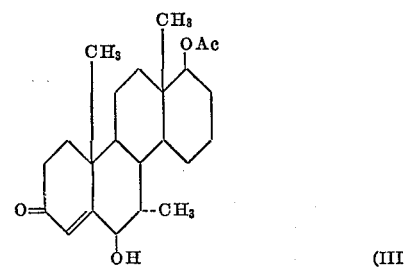
(III)

wherein Ac has the same meaning as above;

(3) treating a thus produced compound of Formula III with lead tetraacetate in the presence of a catalyst to give a compound of the Formula IV

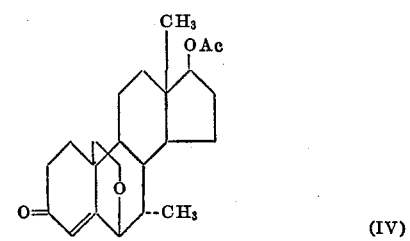
(IV)

wherein Ac has the same meaning as above;

(4) treating with a reducing agent a thus produced compound of Formula IV to yield a compound of the Formula V

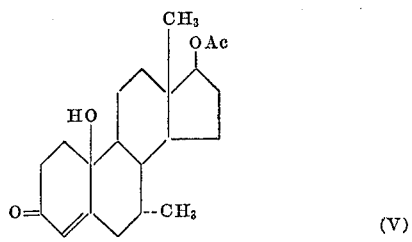

(V)

wherein Ac has the same meaning as above;

(5) hydrolyzing the acyl group at the 17β-position of a thus produced compound of Formula V to give the compound of the Formula VIII

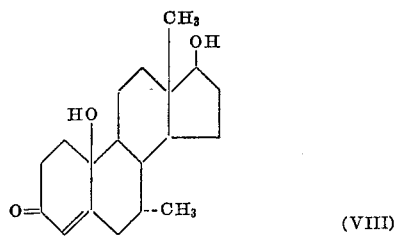

(VIII)

(6) oxidizing at the 17β- and 19-positions the thus produced compound of Formula VIII to yield the compound of the Formula IX

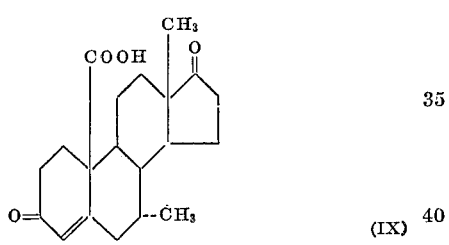

(IX)

(7) decarboxylating at the 19-position the thus produced compound of Formula IX to yield the compound of the Formula X

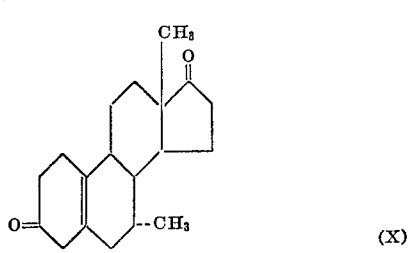

(X)

(8) treating the thus produced compound of Formula X with an alkanol in the presence of a weak organic acid to yield a compound of the Formula XI

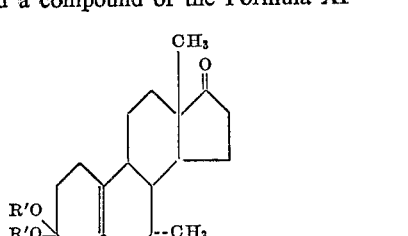

(XI)

wherein R' is lower alkyl;

(9) treating a thus produced compound of Formula XI with an alkylating agent selected from the group consisting of alkylmagnesium halides, alkenylmagnesium halides, alkynylmagnesium halides, alkyllithium, alkynyllithium and alkali metal derivatives of alkynes to yield a corresponding compound of the Formula XII

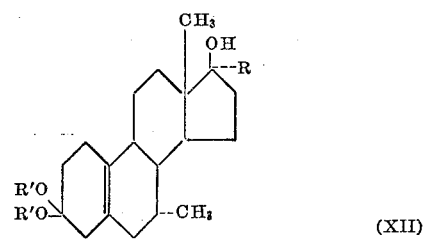

(XII)

wherein R and R' have the same meaning as above;

(10) hydrolyzing the 3-dialkylketal group of a thus produced compound of Formula XII by treatment with a strong acid in a ketone to obtain a corresponding compound of Formula XVI, above.

15. A process for the production of a compound of the Formula XVI

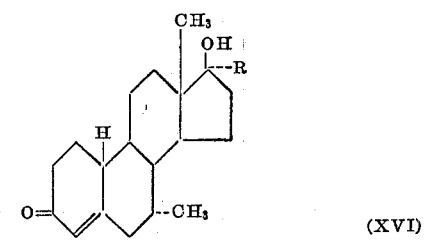

(XVI)

wherein R is selected from the group consisting of alkyl alkenyl and alkynyl which comprises hydrolyzing the 3-dialkylketal group of a corresponding compound of the Formula XII

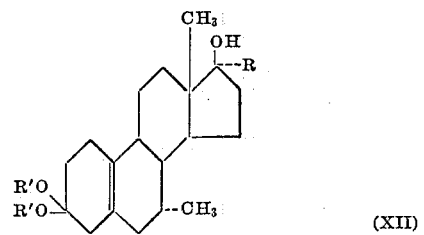

(XII)

wherein R' is lower alkyl and R has the same meaning as above.

16. A process for the production of a compound of the Formula XVI

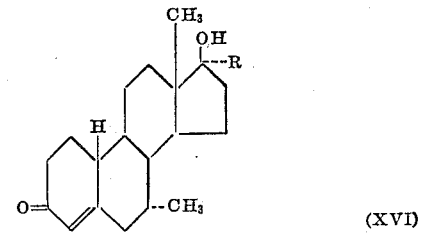

(XVI)

wherein R is selected from the group consisting of alkyl, alkenyl and alkynyl, which comprises:

(1) treating the compound of the Formula I

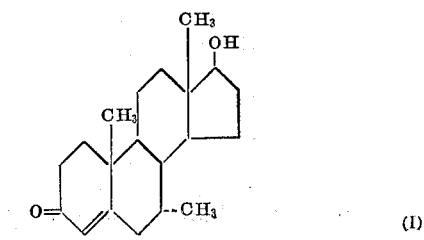

(I)

with an acylating agent to obtain a compound of the Formula II

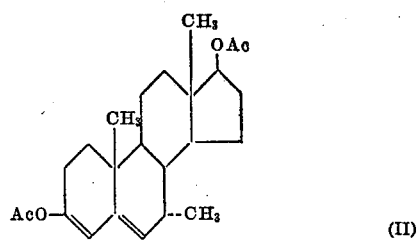

(II)

wherein Ac is the acyl radical of an organic carboxylic acid containing from one to twelve carbon atoms, inclusive;

(2) treating a thus produced compound of Formula II with an organic peracid to yield a compound of the Formula III

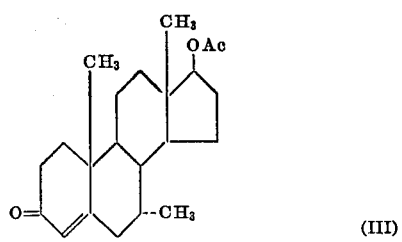

(III)

wherein Ac has the same meaning as above;

(3) treating a thus produced compound of Formula III with lead tetraacetate in the presence of a catalyst to give a compound of the Formula IV

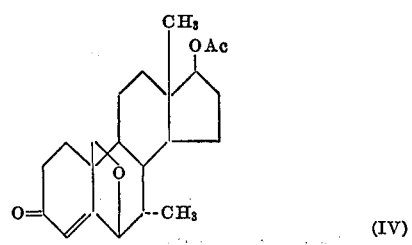

(IV)

wherein Ac has the same meaning as above;

(4) treating with a reducing agent a thus produced compound of Formula IV to yield a compound of the Formula V

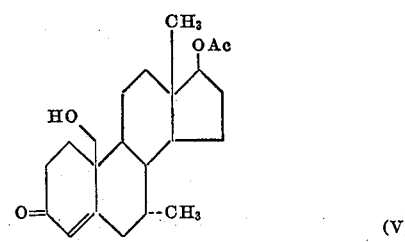

(V)

wherein Ac has the same meaning as above;

(5) hydrolyzing the acyl group at the 17β-position of a thus produced compound of Formula V to give the compound of the Formula VIII

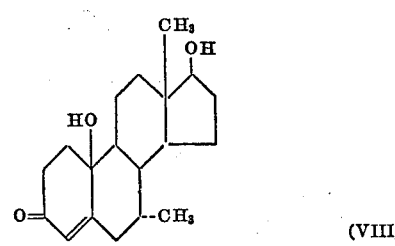

(VIII)

(6) oxidizing at the 17β- and 19-positions the thus produced compound of Formula VIII to yield the compound of the Formula IX

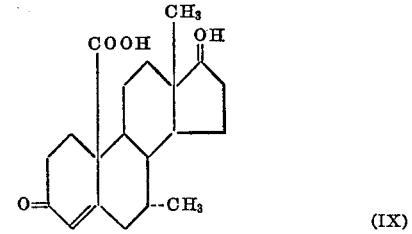

(IX)

(7) decarboxylating at the 19-position the thus produced compound of Formula IX to yield the compound of the Formula X

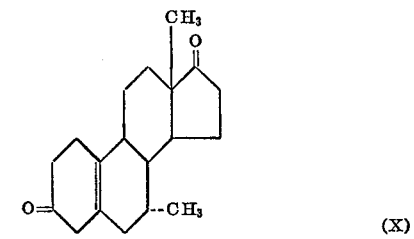

(X)

(8) treating the thus produced compound of Formula X with an alkanol in the presence of a weak organic acid to yield a compound of the Formula XI

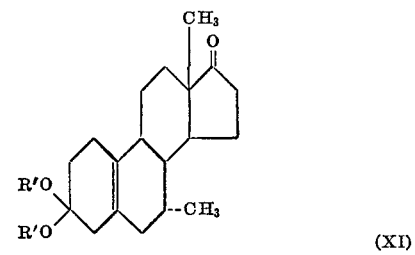

(XI)

wherein R' is lower alkyl;

(9) treating a thus produced compound of Formula XI with an alkylating agent selected from the group consisting of alkylmagnesium halides, alkenylmagnesium halides, alknylmagnesium halides, alkyllithium and alkali metal derivatives of alkynes to yield a corresponding compound of the Formula XII

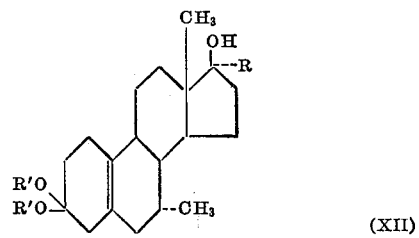

(XII)

wherein R and R' have the same meaning as above;

(10) hydrolyzing the 3-dialkylketal group of a thus produced compound of Formula XII by treatment with a weak organic acid in a ketone to yield a corresponding compound of the Formula XIII

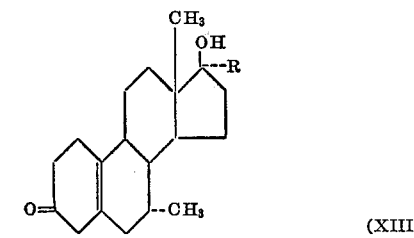

(XIII)

wherein R has the same meaning as above;

(11) treating a compound of Formula XIII with a strong acid in an alkanol to yield a corresponding compound of Formula XVI, above.

17. A process for the production of a compound of the Formula XVI

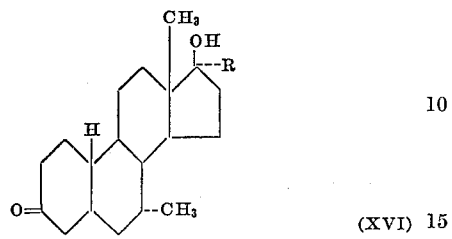

(XVI)

wherein R is selected from the group consisting of alkyl, alkenyl and alkynyl which comprises treating a corresponding compound of the Formula XIII

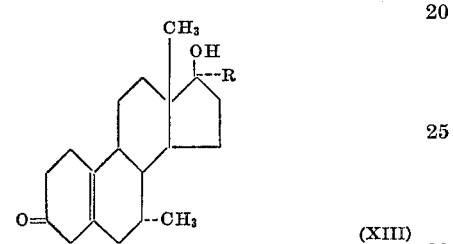

(XIII)

wherein R has the same meaning as above, with a strong acid in an alkanol.

18. A process for the production of a compound of the Formula XVI

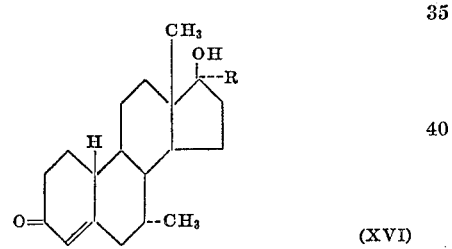

(XVI)

wherein R is selected from the group consisting of alkyl, alkenyl and alkynyl, which comprises:
(1) treating the compound of the Formula I

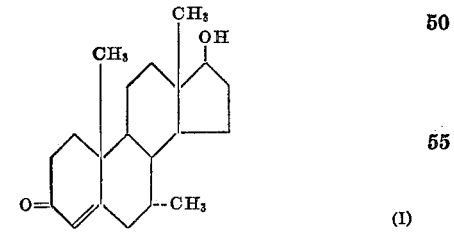

(I)

with an aacylating agent to obtain a compound of the Formula II

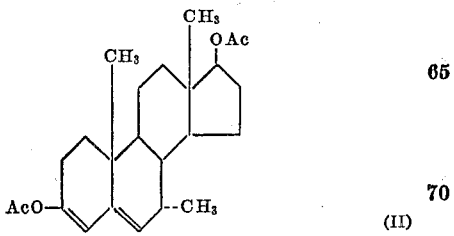

(II)

wherein Ac is the acyl radical of an organic carboxylic acid containing from one to twelve carbon atoms, inclusive;

(2) treating a thus produced compound of Formula II with an organic peracid to yield a compound of the Formula III

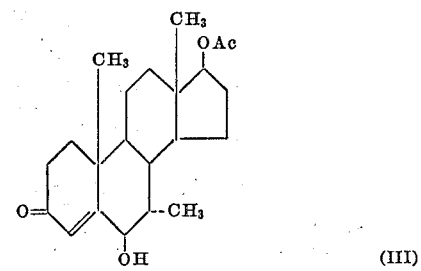

(III)

wherein in Ac has the same meaning as above;
(3) treating a thus produced compound of Formula III with lead tetraacetate in the presence of a catalyst to give a compound of the Formula IV

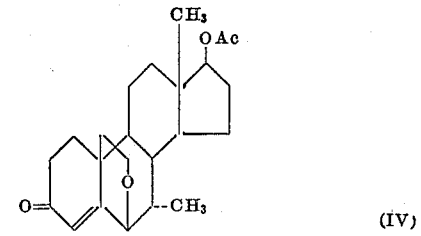

(IV)

wherein in Ac has the same meaning as above;
(4) treating with a reducing agent a thus produced compound of Formula IV to yield a compound of the Formula V

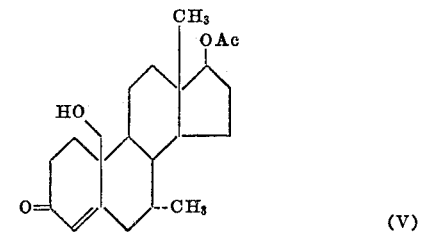

(V)

wherein Ac has the same meaning as above;
(5) treating at the 19-position with an oxidizing agent a thus produced compound of Formula V to give a compound of the Formula VI

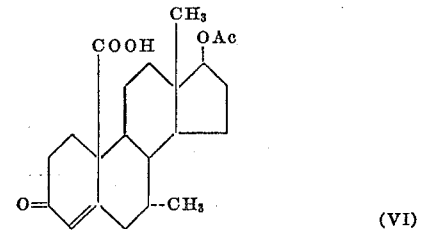

(VI)

wherein Ac has the same meaning as above;
(6) decarboxylating at the 19-position a thus produced compound of Formula VI to yield a compound of the Formula XIV

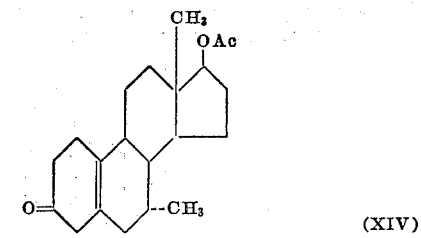

(XIV)

wherein Ac has the same meaning as above;
(7) treating a thus produced compound of Formula IV with an alkanol in the presence of a weak organic acid to yield a corresponding compound of the Formula XV

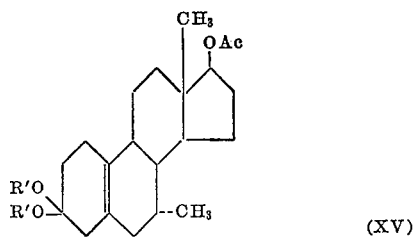
(XV)

wherein Ac has the same meaning as above and R' is lower alkyl;

(8) hydrolyzing at the 17β-position a thus produced compound of Formula XV with a base, followed by oxidation of a thus produced 17β-hydroxyl compound at the 17-position to give a corresponding compound of the Formula XI

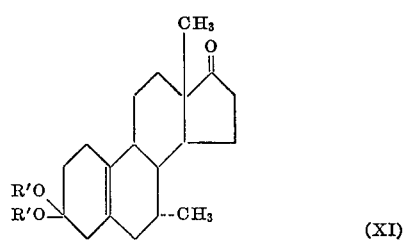
(XI)

wherein R' has the same meaning as above.

(9) treating a thus produced compound of Formula XI with an alkylating agent selected from the group consisting of alkylmagnesium halides, alkenylmagnesium halides, alkynylmagnesium halides, alkyllithium, alkynyllithium and alkali metal derivatives of alkynes to yield a corresponding compound of the Formula XII

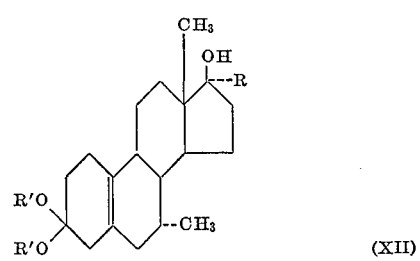
(XII)

wherein R and R' have the same meaning as above,

(10) hydrolyzing the 3-dialkylketal group of a thus produced compound of Formula XII with a strong acid in a ketone to obtain a corresponding compound of Formula XVI, above.

19. A process for the production of a compound of the Formula XVI

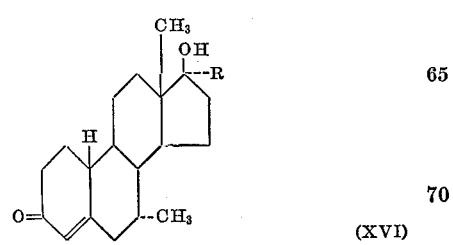
(XVI)

wherein R is selected from the group consisting of alkyl, alkenyl and alkynyl, which comprises:

(1) treating the compound of the Formula I

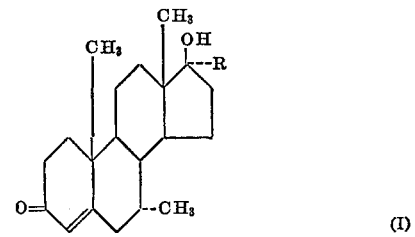
(I)

with an acylating agent to obtain a compound of the Formula II

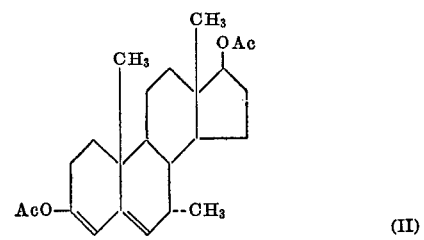
(II)

wherein Ac is the acyl radical of an organic carboxylic acid containing from one to twelve carbon atoms, inclusive;

(2) treating a thus produced compound of Formula II with an organic peracid to yield a compound of the Formula III

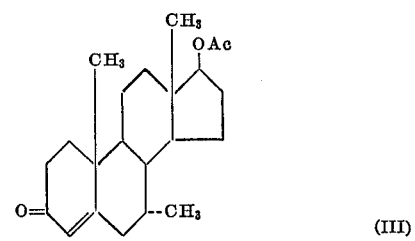
(III)

wherein Ac has the same meaning as above;

(3) treating a thus produced compound of Formula III with lead tetraacetate in the presence of a catalyst to give a compound of the Formula IV

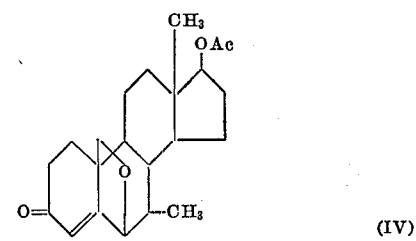
(IV)

wherein Ac has the same meaning as above;

(4) treating with a reducing agent a thus produced compound of Formula IV to yield a compound of the Formula V

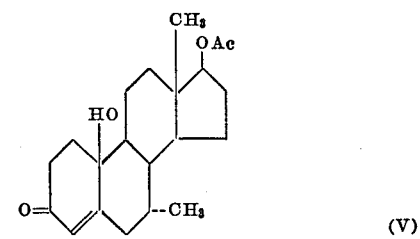
(V)

wherein Ac has the same meaning as above;

(5) treating at the 19-position with an oxidizing agent a thus produced compound of Formula V to give a compound of the Formula VI

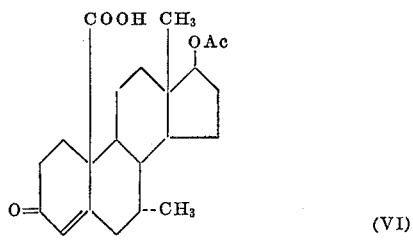

(VI)

wherein Ac has the same meaning as above;

(6) decarboxylating at the 19-position a thus produced compound of Formula VI to yield a compound of the Formula XIV

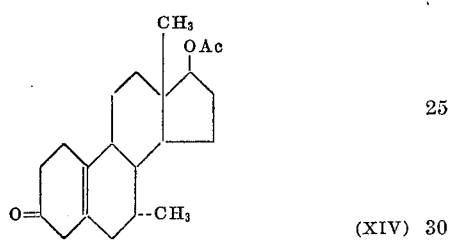

(XIV)

wherein Ac has the same meaning as above;

(7) treating a thus produced compound of Formula XIV with an alkanol in the presence of a weak organic acid to yield a corresponding compound of the Formula XV

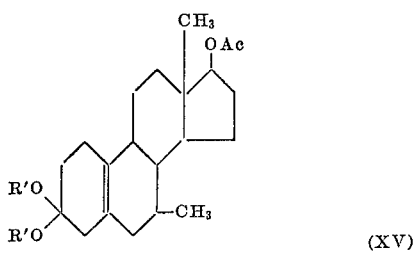

(XV)

wherein Ac has the same meaning as above and R' is lower alkyl;

(8) hydrolyzing at the 17β-position a thus produced compound of Formula XV with a base, followed by oxidation of a thus produced 17β-hydroxyl compound at the 17-position to give a corresponding compound of the Formula XI

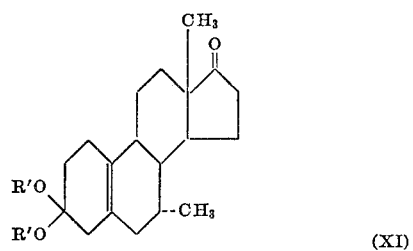

(XI)

wherein R' has the same meaning as above;

(9) treating a thus produced compound of Formula XI with an alkylating agent selected from the group consisting of alkylmagnesium halides, alkenylmagnesium halides, alkynylmagnesium halides, alkyllithium, alkynyllithium and alkali metal derivatives of alkynes to yield a corresponding compound of the Formula XII

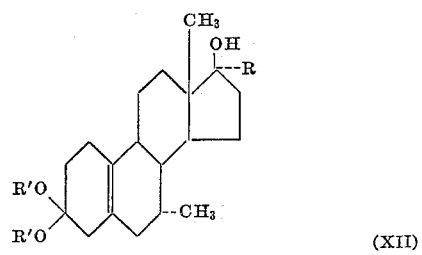

(XII)

wherein R and R' have the same meaning as above;

(10) hydrolyzing the 3-dialkylketal group of a thus produced compound of Formula XII by treatment with a weak organic acid in a ketone to yield a corresponding compound of the Formula XIII

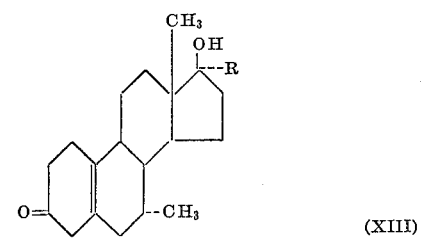

(XIII)

wherein R has the same meaning as above;

(11) treating a compound of Formula XIII with a strong acid in an alkanol to yield a corresponding compound of Formula XVI, above.

20. A process for the production of a compound of the Formula XX

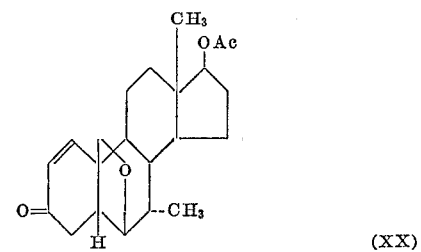

(XX)

wherein Ac is the acyl radical of an organic carboxylic acid containing from one to twelve carbon atoms, inclusive, which comprises:

(1) treating the compound of the Formula I

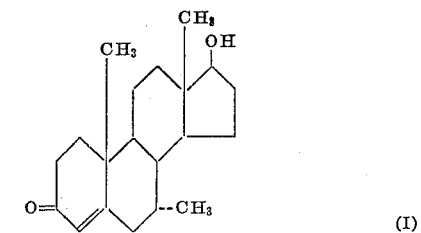

(I)

with an acylating agent to obtain a compound of the Formula II

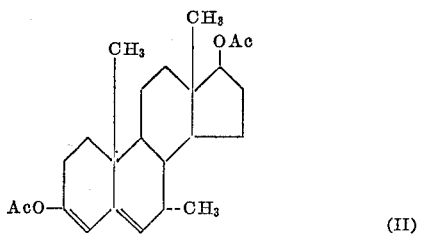

(II)

wherein Ac has the same meaning as above;

(2) treating a thus produced compound of Formula II with an organic peracid to yield a compound of the Formula III

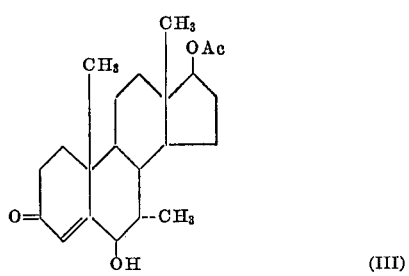

(III)

wherein Ac has the same meaning as above;

(3) treating a thus produced compound of Formula III with hydrogen in the presence of a catalyst to yield a compound of the Formula XVII

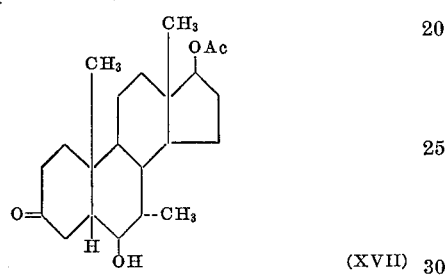

(XVII)

wherein Ac has the same meaning as above;

(4) treating a thus produced compound of Formula XVII with lead tetraacetate in the presence of a catalyst to give a compound of the Formula XVIII

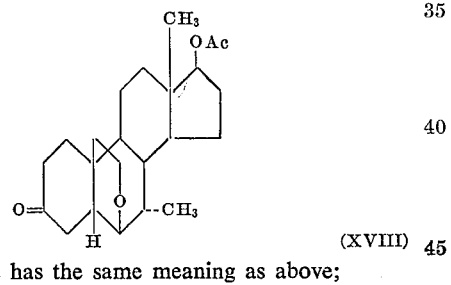

(XVIII)

wherein Ac has the same meaning as above;

(5) treating a thus produced compound of Formula XVIII with a halogen to yield a compound of the Formula XIX

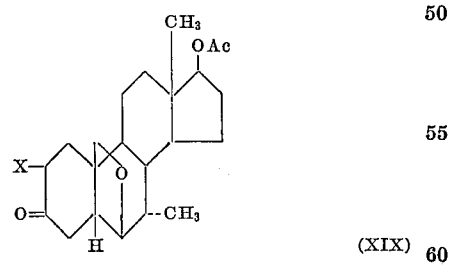

(XIX)

wherein X is a halogen and Ac has the same meaning as above;

(6) dehydrohalogenating a thus produced compound of Formula XIX to yield a compound of Formula XX, above.

21. A process for the production of a compound of the Formula XX

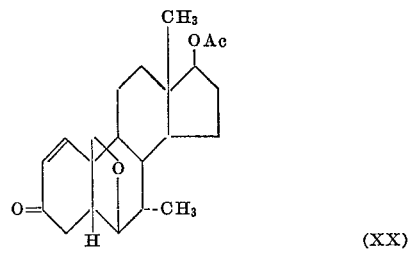

(XX)

wherein Ac is the acyl radical of an organic carboxylic acid containing from one to twelve carbon atoms, inclusive, which comprises dehydrohalogenating a compound of the Formula XIX

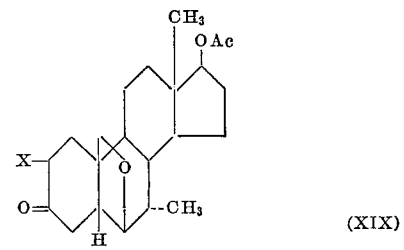

(XIX)

wherein X is a halogen and Ac has the same meaning as above.

References Cited

UNITED STATES PATENTS

| | | |
|---|---|---|
| 3,384,543 | 5/1968 | Campbell et al. |
| 2,783,253 | 2/1957 | Sondheimer et al. ___ 260—397.4 |
| 3,170,934 | 2/1965 | Wettstein et al. _____ 260—397.1 |

FOREIGN PATENTS 994,746  6/1965  Great Britain.

OTHER REFERENCES

Chem. Pharm. Bull. (Japan), vol. 8, No. 1, January 1960, Pp. 84–85 relied on by Hagwara et al.

"Steroid Drugs" by Applezweig (1962), p. 534, McGraw-Hill Inc., New York.

ELBERT L. ROBERTS, Primary Examiner

U.S. Cl. X.R.

260—239.5; 397.1, 397.4, 397.5

UNITED STATES PATENT OFFICE
CERTIFICATE OF CORRECTION

Patent No. 3,515,719  Dated November 3, 1970

Inventor(s) J Allan Campbell, John C. Babcock, John E. Pike

It is certified that error appears in the above-identified patent and that said Letters Patent are hereby corrected as shown below:

Column 5, line 34, for "methyl-9-" read --methyl-19- --. Column 7, line 3, for "lower methyltestosterone" read -- lower alkyl-7α-methyltestosterone --. Column 7, line 18, for "immediate" read -- immediately --. Column 7, line 19, for "by the" read -- by heating the --. Column 11, line 49, for "-19-oic (IX)" read -- -19-oic acid (IX) --. Column 17, line 18, for "17β" read -- 17α --. Column 17, line 21, for "-5(10)-3" read -- -5(10)-estren-3 --. Column 17, line 31, for "-9-" read -- -19- --. Column 18, line 24, for "7α-19" read -- 7α-methyl-19 --. Column 18, line 27, for "-3-3-one" read -- -3-one --. Column 24, line 56, claim 10, formula should read

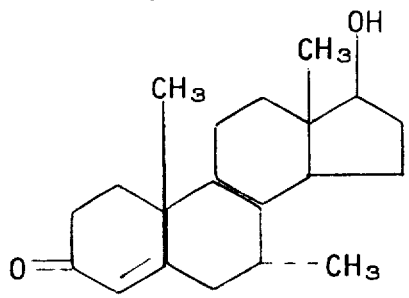

Column 25, line 74, claim 11, formula should read

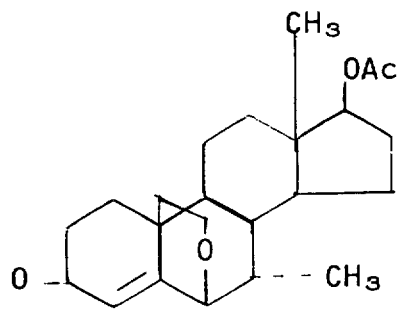

UNITED STATES PATENT OFFICE
CERTIFICATE OF CORRECTION

Patent No. 3,515,719              Dated November 3, 1970

Inventor(s) J Allan Campbell, John C. Babcock, John E. Pike

It is certified that error appears in the above-identified patent and that said Letters Patent are hereby corrected as shown below:

Column 26, line 45, claims 12, for "to" read -- of --.
Column 28, line 22, claim 12, for "alkynylmagesium halides, alkyllithium" read -- alkynylmagnesium alkyllithium --. Column 33, line 29, claim 16, formula should read

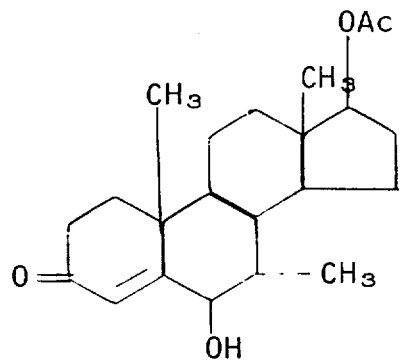

Column 34, line 5, claim 16, formula should read

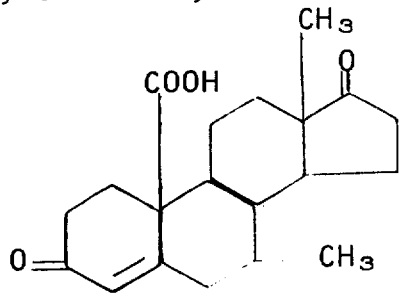

Column 34, line 45, claim 16, for "alknylmagnesium" read -- alkynylmagnesium --. Column 36, line 75, claim 18, for "IV" read -- XIV --.

UNITED STATES PATENT OFFICE
CERTIFICATE OF CORRECTION

Patent No. 3,515,719          Dated November 3, 1970

Inventor(s) J Allan Campbell, John C. Babcock, John E. Pike

It is certified that error appears in the above-identified patent and that said Letters Patent are hereby corrected as shown below:

Column 38, line 4, claim 19, formula should read

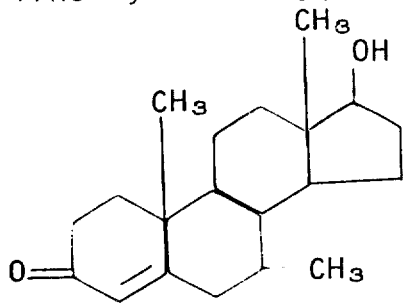

Column 38, line 43, claim 19, formula should read

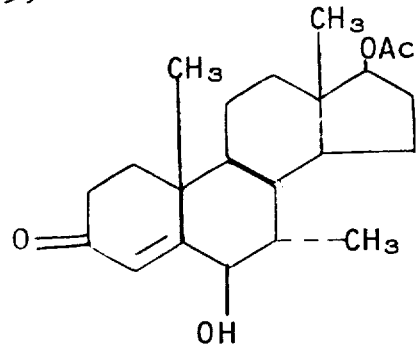

SIGNED AND
SEALED
JAN 19 1971

(SEAL)
Attest:

Edward M. Fletcher, Jr.
Attesting Officer

WILLIAM E. SCHUYLER, JR.
Commissioner of Patents